(12) United States Patent
Kusuno et al.

(10) Patent No.: US 10,846,231 B2
(45) Date of Patent: Nov. 24, 2020

(54) STORAGE APPARATUS, RECORDING MEDIUM, AND STORAGE CONTROL METHOD

(71) Applicant: HITACHI, LTD., Tokyo (JP)

(72) Inventors: Natsuki Kusuno, Tokyo (JP); Toshiya Seki, Tokyo (JP); Tomohiro Nishimoto, Tokyo (JP); Takaki Matsushita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 32 days.

(21) Appl. No.: 15/741,097

(22) PCT Filed: Nov. 13, 2015

(86) PCT No.: PCT/JP2015/081968
§ 371 (c)(1),
(2) Date: Dec. 29, 2017

(87) PCT Pub. No.: WO2017/081811
PCT Pub. Date: May 18, 2017

(65) Prior Publication Data
US 2018/0196755 A1 Jul. 12, 2018

(51) Int. Cl.
*G06F 12/0893* (2016.01)
*G06F 12/02* (2006.01)
(Continued)

(52) U.S. Cl.
CPC ........ *G06F 12/0893* (2013.01); *G06F 3/0608* (2013.01); *G06F 3/0631* (2013.01);
(Continued)

(58) Field of Classification Search
None
See application file for complete search history.

(56) References Cited

U.S. PATENT DOCUMENTS

2015/0193342 A1* 7/2015 Ohara ................. G06F 12/0873
711/120
2015/0324145 A1 11/2015 Akutsu et al.
(Continued)

FOREIGN PATENT DOCUMENTS

WO WO-2014049636 A1 * 4/2014 ......... G06F 12/0873
WO 2014/115320 A1 7/2014
(Continued)

OTHER PUBLICATIONS

International Search Report for WO 2017/081811 A1, dated Feb. 2, 2016.
(Continued)

*Primary Examiner* — Gary W. Cygiel
(74) *Attorney, Agent, or Firm* — Volpe Koenig

(57) ABSTRACT

To prevent an excessive increase of a dirty data amount in a cache memory. A processor acquires storage device information from each of storage devices. When receiving a write request to a first storage device group from a higher-level apparatus, the processor determines whether a write destination cache area corresponding to a write destination address indicated by the write request is reserved. When determining that the write destination cache area is not reserved, the processor performs, on the basis of the storage device information and cache information, reservation determination for determining whether to reserve the write destination cache area. When determining to reserve the write destination cache area, the processor reserves the write destination cache area. When determining not to reserve the write destination cache area, the processor stands by for the reservation of the write destination cache area.

9 Claims, 39 Drawing Sheets

(51) Int. Cl.
    *G06F 12/0804*     (2016.01)
    *G06F 11/10*     (2006.01)
    *G06F 12/0868*     (2016.01)
    *G06F 3/06*     (2006.01)

(52) U.S. Cl.
    CPC .......... *G06F 3/0656* (2013.01); *G06F 3/0683* (2013.01); *G06F 11/1076* (2013.01); *G06F 12/0246* (2013.01); *G06F 12/0804* (2013.01); *G06F 12/0868* (2013.01); *G06F 2212/1044* (2013.01); *G06F 2212/214* (2013.01); *G06F 2212/262* (2013.01); *G06F 2212/312* (2013.01); *G06F 2212/401* (2013.01); *G06F 2212/7201* (2013.01)

(56) References Cited

U.S. PATENT DOCUMENTS

| | | |
|---|---|---|
| 2015/0370713 A1 | 12/2015 | Morishita et al. |
| 2015/0378613 A1 | 12/2015 | Koseki |
| 2016/0196075 A1 | 7/2016 | Matsushita |

FOREIGN PATENT DOCUMENTS

| | | |
|---|---|---|
| WO | 2014/184941 A1 | 11/2014 |
| WO | 2015/008375 A1 | 1/2015 |
| WO | 2015/052798 A1 | 4/2015 |

OTHER PUBLICATIONS

Japanese Office Action dated Sep. 18, 2018 for the Japanese Patent Application No. 2017-549954.

\* cited by examiner

FIG.9

Disk management TBL 13100

| 13101 | 13102 | 13103 | 13104 | 13105 | 13106 | 13107 | 13108 | 13109 | 13110 | 13111 | 13112 | 13113 |
|---|---|---|---|---|---|---|---|---|---|---|---|---|
| Disk# | Disk type | Information update date | Residual guarantee period | Predicted residual life | Compressed configuration | FM read total amount | FM write total amount | Average compression ratio | Residual number of times of erasing | FM use amount | Physical capacity | Logical capacity |
| 0 | SSD (SLC) | yy.mm.dd | 1460 day | 3000 day | ON | 10 GB | 123 GB | 30 % | 95 % | 50 GB | 1 TB | 8 TB |
| 1 | SSD (SLC) | | | | | | | | | | | |
| 2 | SSD (MLC) | | | | | | | | | | | |
| n | SSD (MLC) | | | | OFF | | | — | 50 % | — | 1 TB | — |
| m | HDD | | — | — | | | | | — | — | 1 TB | |

FIG.10

RG management TBL 13200

| RG# 13201 | Disk type 13202 | RAID Level 13203 | RAID configuration 13204 | Compressed setting 13205 | Disk# 13206 | | |
|---|---|---|---|---|---|---|---|
| 0 | SSD (SLC) | RAID 5 | 3D + 1P | ON | 1 | 10 | ... |
| 1 | SSD (SLC) | RAID 6 | 6D + 2P | ON | 33 | 34 | ... |
| 2 | SSD (MLC) | RAID 1 | 3D + 3P | OFF | | | ... |
| 3 | SSD (MLC) | RAID 1+0 | — | — | | | ... |
| n | HDD | RAID 5 | 7D + 1P | OFF | | 40 | ... |

FIG.11

| Pool# | RG# | RG residual capacity | Pool residual capacity |
|---|---|---|---|
| 0 | 0 | 123 GB | 3456 GB |
| | 1 | 234 GB | |
| | 2 | 321 GB | |
| | 3 | 456 GB | |
| | n | n | |

13301  13302  13303  13304

Pool management TBL — 13300

FIG.12

| Disk# | Entry # | Size | Start-LBA | Last-LBA | Allocation destination extent # |
|---|---|---|---|---|---|
| 0 | 0 | 12 MB | 0 | 100 | 100 |
| | 1 | 12 MB | 120 | 220 | 220 |
| | 2 | 12 MB | 2 | 102 | 102 |
| | 3 | 12 MB | 4321 | 4421 | N/A |
| | n | 12 MB | n | m | n |

Entry management TBL 13800

13801 Disk#
13802 Entry #
13803 Size
13804 Start-LBA
13805 Last-LBA
13806 Allocation destination extent #

FIG.13

| Extent # | Size | Disk# | Allocated entry # |
|---|---|---|---|
| 0 | 1 GB | 0 | 0 |
| | | ... | ... |
| | | k | k |
| | | n | n |
| | | ... | ... |
| | | m | m |

13401 — Extent #
13402 — Size
13403 — Disk#
13404 — Allocated entry #
13400 — Extent management TBL

FIG.14

| LU# | Virtual capacity | Actual use capacity | Virtual extent # | Allocated extent # |
|---|---|---|---|---|
| 0 | 800 GB | 150 GB | 0 | 0 |
| | | | 1 | 100 |
| | | | 2 | n |
| | | | 3 | - |
| | | | ... | ... |
| | | | n | - |

13501  13502  13503  13504  13505

Virtual volume management TBL  13500

FIG.15

| Disk# | Entry # | Ave WR I/O Size | Ave RD I/O Size | WR ratio | WR amount | RD amount |
|---|---|---|---|---|---|---|
| 0 | 1 | 4 KB | 4 KB | 80% | 20 MB | 1 MB |
|  | 2 | 64 KB | 64 KB | 20% | 100 MB | 500 MB |
| ... | ... | ... | ... | ... | ... | ... |

Statistical information management TBL ~ 13600

FIG.16

| Disk# | Entry # | WR amount | Compression ratio | FM WR predicted amount |
|---|---|---|---|---|
| 0 | 1 | 50 MB | 50% | 25 MB |
| | 2 | 100 MB | | 50 MB |
| | ... | ... | | ... |
| | n | n | | n MB |

13701  13702  13703  13704  13705

FM WR amount prediction TBL  13700

FIG.17

| Virtual address | Cache area # | Status |
|---|---|---|
| 0 | 0 | 1 |
| 10 | 1 | 1 |
| 20 | 2 | 1 |
| 30 | 3 | 0 |
| ... | ... | ... |

32101
32102
32103

Cache management TBL
32100

FIG.18

| RG# | RG actual free capacity | Margin | RG dirty data amount | Pool # |
|---|---|---|---|---|
| 0 | 11000000 | 9856620 | 3000000 | 0 |
| 1 | 18000000 | 9856620 | 4000000 | 0 |
| 2 | 12000000 | 9856620 | 2500000 | 0 |
| 3 | 80000000 | – | 2500000 | 1 |
| 4 | 80000000 | – | 1500000 | 1 |
| 5 | 80000000 | – | 80000 | 1 |

RG determination management TBL 32200

| System flag | Pool # | Pool flag | RG# | RG flag |
|---|---|---|---|---|
| ON | 0 | ON | 0 | ON |
| | | | 1 | OFF |
| | | | 2 | OFF |
| | 1 | OFF | 3 | OFF |
| | | | 4 | OFF |
| | | | 5 | OFF |

32301 / 32302 / 32303 / 32304 / 32305

Determination result management TBL
32300

FIG.21

| Start-LBA 23101 | Block# 23102 | Page# 23103 | CW# 23104 |
|---|---|---|---|
| 0 | 0 | 0 | 0 |
| 8192 | 0 | 0 | 4 |
| 16384 | 1 | 0 | 2 |
| 24576 | N/A | N/A | N/A |
| ... | | | |
| n | n | n | n |

Logical-physical conversion TBL 23100

FIG.22

| Write request total amount | Read request total amount | FM write total amount | Average compression ratio | FM read total amount | Residual number of times of erasing |
|---|---|---|---|---|---|
| 23211 | 23212 | 23213 | 23214 | 23215 | 23216 |
| 123 GB | 45 GB | 74 GB | 60% | 20 GB | 1234567 |

Statistical information management TBL 23200

STORAGE APPARATUS, RECORDING MEDIUM, AND STORAGE CONTROL METHOD

TECHNICAL FIELD

The present invention relates to a storage apparatus.

BACKGROUND ART

In general, a storage apparatus includes a physical storage device that stores data and a controller that controls the physical storage device. The controller provides a data storage space (in general, a logical volume) to a computer (e.g., a host computer) coupled to the storage apparatus.

The storage apparatus can increase speed of I/O processing and exhibit high failure resistance against failures of the physical storage device by using a plurality of physical storage device in a PG (parity Group) configuration such as a RAID (Redundant Array of Independent (or Inexpensive) Disks).

The storage apparatus includes, as the physical storage device, a HDD (Hard Disk Drive) or a physical storage device including a flash memory (FM), for example, an SSD (Solid State Drive).

Data compression is explained. The data compression is a technique for reducing a data amount stored in the physical storage device by compressing data. The data compression realizes a reduction of footprints and a reduction of bit costs.

In future, the SSD is likely to have the compressing function explained above for the purpose of, for example, a reduction of bit costs of the SSD itself. The physical storage device having the compressing function is hereinafter referred to as compressing drive.

When the SSD itself is mounted with the compressing function, a storage controller does not need to be aware of data after compression and can perform read/write (hereinafter, R/W) in the same manner as a storage device not having the compressing function. The compressing drive, in which the data is written by the storage controller, can reduce a use amount of an FW by executing compression processing on the inside and storing the data in the FM. However, the storage controller can write the data in the compressing drive only by a capacity of the compressing drive. That is, in a state in which the storage controller writes the data up to the full capacity of the compressing drive, the storage controller cannot further write data in a free space increased by the compression of the data in the compressing drive. This is because an area in which the storage controller can perform write in the compressing drive is consumed by an uncompressed data size.

PTL 1 describes a technique in which, in a storage apparatus using semiconductor storage units that compress and store data, a storage controller migrates data between the semiconductor storage units to reduce a risk of depletion of the semiconductor storage units.

CITATION LIST

Patent Literature

[PTL 1] International Publication No. WO 2015/008375

SUMMARY OF INVENTION

Technical Problem

When a free capacity of a storage device is insufficient, dirty data, a destage destination of which is the storage device, accumulates in a cache memory. This is likely to cause performance deterioration of a service that uses a cache memory resource, a maintenance failure, a host system down, and the like.

Solution to Problem

In order to solve the problems, a storage apparatus according to an aspect of the present invention includes: a plurality of storage devices; a first memory; and a processor coupled to the plurality of storage devices, the first memory, and a higher-level apparatus. The processor configures at least a part of the plurality of storage devices as a first storage device group. The processor creates cache information indicating a state of a plurality of cache areas in the first memory. The processor associates, with a first storage device group, the cache areas in which data from the higher-level apparatus is stored. The processor destages data in the cache areas to the storage device corresponding to the cache areas. The storage device compresses the destaged data to convert the destaged data into compressed data, stores the compressed data, and stores storage device information based on a use amount of the storage device. The processor acquires the storage device information from each of the storage devices. When receiving a write request to the first storage device group from the higher-level apparatus, the processor determines whether a write destination cache area corresponding to a write destination address indicated by the write request is reserved. When determining that the write destination cache area is not reserved, the processor performs, on the basis of the storage device information and the cache information, reservation determination for determining whether to reserve the write destination cache area. When determining to reserve the write destination cache area, the processor reserves the write destination cache area. When determining not to reserve the write destination cache area, the processor stands by for the reservation of the write destination cache area.

Advantageous Effects of Invention

It is possible to prevent an excessive increase in a dirty data amount in a cache memory.

BRIEF DESCRIPTION OF DRAWINGS

FIG. 9 is a diagram showing a configuration example of a Disk management table 13100.

FIG. 10 is a diagram showing a configuration example of an RG management table 13200.

FIG. 11 is a diagram showing a configuration example of a Pool management table 13300.

FIG. 12 is a diagram showing a configuration example of an entry management table 13800.

FIG. 13 is a diagram showing a configuration example of an extent management table 13400.

FIG. 14 is a diagram showing a configuration example of a virtual volume management table 13500.

FIG. 15 is a diagram showing a configuration example of a statistical information management table 13600.

FIG. 16 is a diagram showing a configuration example of an FM WR amount prediction table 13700 in the first embodiment.

FIG. 17 is a diagram showing a configuration example of a cache management table 32100.

FIG. 18 is a diagram showing a configuration example of an RG determination management table 32200.

FIG. 19 is a diagram showing a configuration example of a determination result management table 32300.

FIG. 21 is a diagram showing a configuration example of a logical-physical conversion table 23100.

FIG. 22 is a diagram showing a configuration example of a statistical information management table 23200 in the SSD.

DESCRIPTION OF EMBODIMENTS

Figure 1:
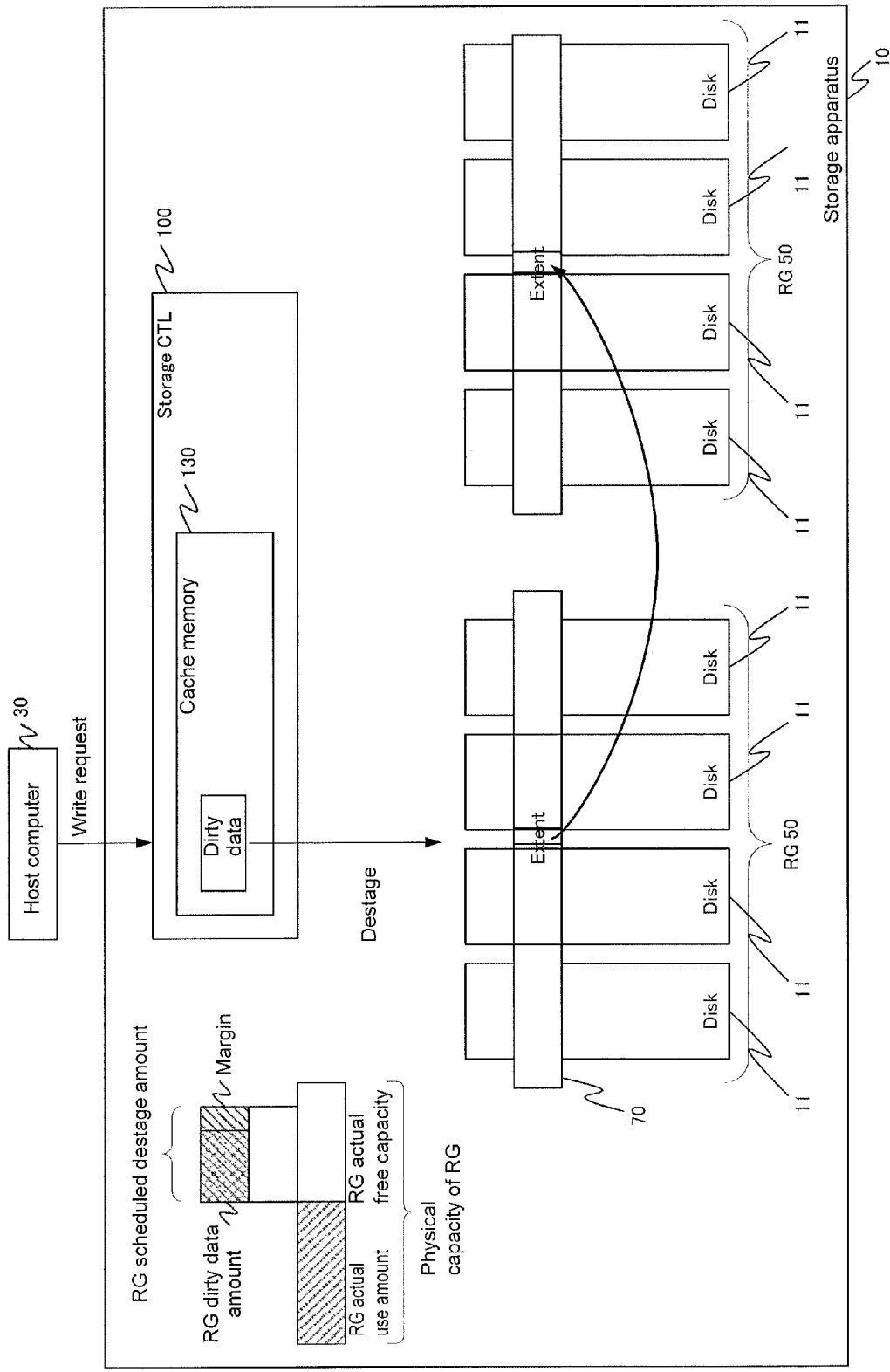
FIG. 1 is a diagram showing an overview of an embodiment.

Embodiments of the present invention are explained below.

In the following explanation, various kinds of information are explained using an expression "AAA table". However, the various kinds of information may be represented by a data structure other than the table. The "AAA table" can be called "AAA information" to indicate that the various kinds of information do not depend on the data structure.

In the following explanation, a number is used as identification information of an element (e.g., an extent). However, other kinds of identification information (e.g., a name and an identifier) may be used.

In the following explanation, processing is sometimes explained using "program" as a subject. However, the program performs, while using a storage resource (e.g., a memory) and/or a communication interface apparatus (e.g., a communication port) as appropriate, decided processing by being executed by a processor (e.g., a CPU (Central Processing Unit)) included in a controller (a storage controller or an SSD controller). Therefore, the subject of the processing may be the controller or the processor. The controller may include a hardware circuit that performs a part or the entire processing. A computer program may be installed from a program source. The program source may be, for example, a program distribution server or a computer-readable storage medium.

In the following explanation, a physical storage device is sometimes described as "Disk" for convenience. However, the description does not always mean that a storage medium included in the physical storage device is a disk-like storage medium. The physical storage device may be, for example, an SSD.

In the following explanation, a period or a time is used. However, a unit of the period or the time is not limited to the examples described below. For example, the unit of the period or the time may be any one of or a combination of two or more of year, month, day, hour, minute, and second.

In the following explanation, it is assumed that a nonvolatile semiconductor storage medium included in the SSD is a flash memory (FM). It is assumed that the flash memory is a flash memory of a type in which erasing is performed in block units and R/W is performed in page units, typically, a flash memory of a NAND type. However, flash memory may be other types of flash memories (e.g., a NOR type) instead of the NAND type. Instead of the flash memory, other types of nonvolatile semiconductor storage media, for example, a phase change memory may be adopted.

In general, the flash memory of the NAND type is configured by a plurality of blocks (physical blocks). Each of the blocks is configured by a plurality of pages (physical pages). A logical page group (a logical storage space) based on one or more SSDs (e.g., a RAID group explained below) may be provided. A physical page in which no data is written can be referred to as "free page". Concerning each of logical pages, data written recently can be referred to as "valid data". Data that changes to old data because the valid data is written can be referred to as "invalid data". A physical page in which the valid data is stored can be referred to as "valid page". A physical page in which the invalid data is stored can be referred to as "invalid page".

FIG. 1 is a diagram showing an overview of the embodiment.

A storage apparatus 10 includes a storage controller 100 and a plurality of physical storage devices (Disks) 11. The plurality of physical storage devices 11 configure a RAID group (RG) 50. The RG 50 may be a PG (Parity Group). The RG 50 is a base of a logical storage area. The logical storage area may be an extent 70 or may be the entire or a part of a logical volume (LU: Logical Unit) provided to a higher-level apparatus (e.g., a host computer 30) coupled to the storage apparatus 10. Note that the storage controller 100 may manage the RG as a VDEV (Virtual Device), which is a logical volume, or may divide one RG into a plurality of VDEVs and manage the VDEVs.

The storage controller 100 includes a cache memory 130. Write data from the higher-level apparatus is stored in the cache memory 130 and thereafter destaged to the RG 50. The storage controller 100 manages, as dirty data, data before destage among the data stored in the cache memory 130.

When receiving a write request from the higher-level apparatus, the storage controller 100 determines whether an RG actual free capacity of an RG, which is a write destination of the write request, is larger than an RG scheduled destage amount of the RG. The RG actual free capacity is a physical free space of the RG and is a value obtained by subtracting an RG actual use amount, which is a physical use amount of the RG, from a physical capacity of the RG. The RG scheduled destage amount is an amount of data that is likely to be destaged to the RG. The RG scheduled destage amount is, for example, in the cache memory 130, a sum of an RG dirty data amount, which is an amount of dirty data corresponding to the RG, and a margin serving as a data amount, which is a predicted value of an amount of dirty data added until destage processing besides the RG dirty data amount. Note that the RG scheduled destage amount may include a write data amount indicated in the write request.

When the Disks 11 have a compressing function, the storage controller 100 acquires internal information of each of the Disks 11 and calculates an RG actual use amount on the basis of the internal information.

When it is determined that the RG actual free capacity of the RG is sufficient for the destage, the storage controller 100 transmits a write data transfer permission notification to the host computer 30, receives write data from the host computer 30, and writes the write data in the cache memory 130. Thereafter, the storage controller 100 performs destage from the cache memory 130 to the RG 50 asynchronously with the write request.

When it is determined that the RG actual free capacity of the RG is insufficient to the destage, the storage controller 100 executes a free waiting job of the RG. During the free waiting job, the storage controller 100 does not reserve an area of the cache memory 130 for the write data from the higher-level apparatus and does not receive the write data to the RG. Thereafter, the storage controller 100 executes data arrangement control processing for migrating data between RGs to thereby increase the RG actual free capacity of the RG. According to the increase of the RG actual free capacity, when it is determined that the RG actual free capacity of the RG is larger than the RG scheduled destage amount, the storage controller 100 releases the free waiting job of the RG, receives the write data from the higher-level apparatus, and writes the write data in the cache memory.

Note that, during the free waiting job, an administrator may increase the RG actual free capacity of the RG by adding the physical storage device 11 to the RG. In this case, the storage controller 100 does not have to execute the data arrangement control processing.

The data arrangement control processing is explained.

The storage controller 100 performs depletion avoidance processing, life leveling processing, I/O performance leveling (rebalance) processing (input/output leveling processing), rearrangement processing in storage tier virtualization, and the like of the RAID group 50 as the data arrangement control processing for migrating data between the RAID groups 50 separately from processing involved in an I/O request from the higher-level apparatus. The RAID group is an example of the semiconductor storage unit. Note that the semiconductor storage unit may be one physical storage device 11.

The SSD has an advantage that I/O processing is extremely fast compared with a HDD. However, the SSD also has a disadvantage that there is an upper limit in the number of times of write of data and life is short compared with the HDD.

In the flash memory (typically, the flash memory of the NAND type), when it is attempted to rewrite data, data cannot be directly written on a physical area where the data is stored. In order to perform the data rewrite for the data on the physical area, it is necessary to execute erasing processing (hereinafter, block erasing) on the data on the physical area in a unit called block, which is an erasing unit of the flash memory, and thereafter write data on the physical area where the block erasing is executed.

However, there is a limit in the number of times of the block erasing (hereinafter, the number of times of erasing) concerning each of the blocks because of a physical restriction on the flash memory. When the number of times of erasing of a block exceeds the limit, data cannot be stored in the block. That is, when the numbers of times of erasing of all blocks configuring an SSD exceed the limit, the SSD exhausts the life.

Therefore, in a general SSD, extension of the life of the SSD is achieved by using a method called wear leveling (hereinafter, WL). In the WL, in general, data updated at a low frequency is stored in a block having a large number of times of erasing. Data updated at a high frequency is stored in a block having a small number of data erasing. Consequently, it is possible to level the numbers of times of erasing among the blocks and prevent only a specific block from being deteriorated.

When the SSD is adopted as the physical storage device of the storage apparatus, in general, a plurality of SSDs are mounted on the storage apparatus. In such a storage apparatus, even if deterioration of only specific blocks can be suppressed in the SSDs, imbalance occurs in loads among the SSDs. The loads sometimes concentrate on only a specific SSD. Therefore, there is known a method of applying the WL among the SSDs and level the numbers of times of erasing among the plurality of SSDs to realize extension of the life of the entire storage apparatus. In the following explanation, the WL performed among physical storage devices such as SSDs is referred to as "life leveling".

In the life leveling, the storage controller determines a migration target SSD and migration target data.

In the data arrangement control processing, the storage controller 100 acquires internal information concerning each of the physical storage devices from each of the physical storage devices 11. For example, if the physical storage device 11 is an SSD (a storage device including a flash memory), the internal information is various kinds of capacity information (an overall capacity, an actual use amount, a total amount of data written in the flash memory after data compression, etc.), information concerning life, and the like.

The storage controller 100 calculates a depletion risk of an RG on the basis of these kinds of internal information and statistical information concerning an I/O amount and determines necessity of execution of the depletion avoidance processing. The depletion risk is calculated by, for example, write I/O amount (WR I/O amount) of the RG RG actual free capacity. In the following explanation, write is sometimes referred to as WR and read is sometimes referred to as RD. The depletion risk may be RG actual WR amount (a total of total amounts of FM write), which is an amount written in the RG, actual capacity (a total of physical capacities) of the R.G. In the depletion avoidance processing, first, the storage controller 100 specifies the RG 50 that has a high depletion risk and cannot receive WR because RG depletion occurs in near future and the RG 50 predicted to have a low depletion risk and a long time until RG depletion.

Subsequently, the storage controller 100 determines a data amount (a migration data amount) migrated from the RG 50 having the high depletion risk to the RG 50 having the low depletion risk. The migration data amount may be a migration data amount smaller than a threshold (e.g., an RG use amount of 90%) concerning a depletion risk set by the user or may be a migration amount that can level depletion risk between the RGs 50.

Subsequently, the storage controller 100 migrates data by the determined migration data amount. A range of a storage area in migrating the data is referred to as "extent". As indicated by reference numeral 70, the extent is an address range (a logical area) extending over the plurality of physical storage device 11 (e.g., SSDs). A load for data migration increases in a small unit such as a block unit or a page unit of the flash memory. On the other hand, it is possible to reduce a load for data migration of the storage controller 100 by performing the data migration in a unit larger than the block and the page, that is, a unit called extent extending over the plurality of RGs 50.

After the depletion avoidance processing execution or when determining that the depletion avoidance processing is unnecessary, the storage controller 100 calculates the residual life of the RG 50 and determines necessity of execution of the life leveling processing. For example, a minimum value of residual life information of the physical storage devices 11 (the SSDs) configuring the RG 50 is set as the residual life of the RG 50. Alternatively, the residual life of the RG 50 may be an average of the residual lives of the physical storage devices 11 (the SSDs) configuring the RG 50. In the life leveling processing, first, the storage controller 100 specifies an RG configured by SSDs that have short residual lives, exhaust the lives in near future, and become unusable and an RG configured by SSDs having long residual lives.

Subsequently, the storage controller 100 determines an extent having a high WR load in the RG having the short residual life and an extent having a low WR load in the RG having the long residual life and exchanges data of the extents.

Specifically, in order to determine a WR load, the storage controller 100 measures a WR data amount for each of the extents. For example, when a WR data amount to an SSD is large, rewrite of a block frequently occurs and the number of times of erasing of the block increases. When the number of times of erasing of the block increases, the number of times of erasing of the block reaches a limit (an upper limit value). Read for the block can be performed but WR in the block cannot be performed. The SSD in which such blocks increase cannot be used. Therefore, the storage controller 100 finds an extent having a large WR data amount and migrates data included in the extent from the RG of the SSDs having the short lives to the RG of the SSDs having the long lives.

Consequently, it is possible to level the numbers of times of erasing among the SSDs without increasing the load of the storage controller 100. By exchanging data between an extent having a large WR I/O amount in the RG of the SSDs having the short lives and an extent having a small WR I/O amount in the RG of the SSDs having the long lives, it is possible to realize the life leveling with a minimum migration data amount.

After the life leveling processing execution or when it is determined that the life leveling processing is unnecessary, the storage controller 100 calculates an I/O amount of the RG 50 and determines necessity of execution of I/O performance rebalance processing. In the I/O performance rebalance processing, first, the storage controller 100 specifies an RG having a large I/O amount and a high I/O load and an RG having a small I/O amount and a low I/O load.

Subsequently, the storage controller 100 determines an extent having a high I/O load in the RG having the high I/O load and an extent having a low I/O load in the RG having the low I/O load and exchanges data of the extents.

Note that the storage controller 100 does not have to include any one kind of processing in the data arrangement control processing.

Each of the Embodiments is explained in detail below.

First Embodiment

Figure 2:
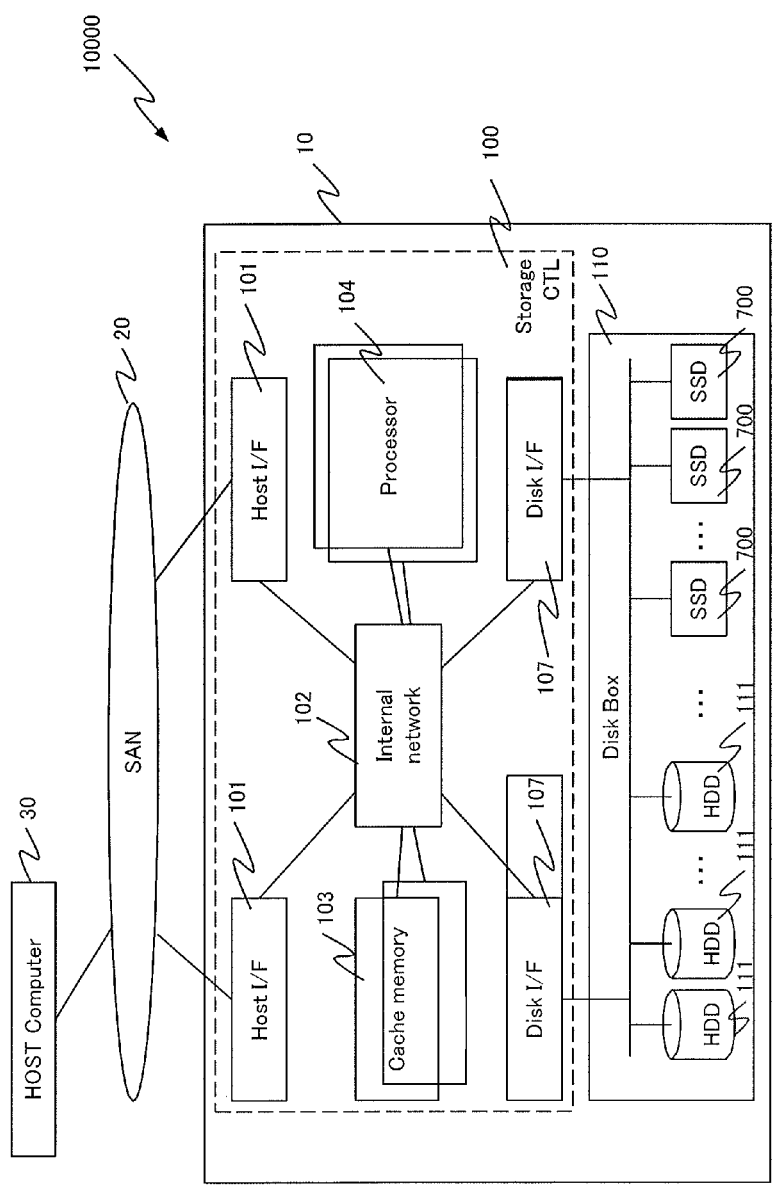
FIG. 2 is a diagram showing a configuration example of a storage system 10000 including a storage apparatus 10 according to a first embodiment.

FIG. 2 is a diagram showing a configuration example of a storage system 10000 including the storage apparatus 10 according to a first embodiment.

The storage system 10000 includes the storage apparatus 10 and the host computer 30. The host computer 30 is an example of a higher-level apparatus that uses the storage apparatus 10. The host computer 30 is, for example, an application server. The host computer 30 and the storage apparatus 10 are communicably coupled through, for example, a SAN (Storage Area Network) 20. As the SAN 20, it is possible to use, for example, a fiber channel, a SCSI (Small Computer System interface), an iSCSI (internet Small Computer System Interface), a USB (Universal Serial Bus), an IEEE 1394 bus, a SAS (Serial Attached SCSI), and the like. Instead of the SAN 20, communication networks of other types (e.g., a LAN (Local Area Network)) may be adopted. Note that, in the example shown in the figure, the storage system 10000 includes one each of the host computer 30 and the storage apparatus 10. However, the storage system 10000 may include a plurality of at least one of the host computers 30 or the storage apparatuses 10.

The host computer 30 executes control software (not shown in the figure), which issues a control command or the like to the storage apparatus 10, to thereby issue the control command or the like to the storage apparatus 10 and perform maintenance and management of the storage apparatus 10. Processing based on the control command is executed by the storage apparatus 10, whereby it is possible to perform various kinds of work such as a change of a RAID level of the RGs included in the storage apparatus 10, adjustment of various start thresholds for the depletion avoidance processing, the life leveling processing, and the I/O performance rebalance processing, and ON/OFF configuration of the compressing function in Pool units or RG units. Note that the RG 50 is a physical storage device group that is configured by a plurality of SSDs (or HDDs) and stores data according to a Predetermined RAID level. As a computer that issues the control command to the storage apparatus 10, a computer separate from the host computer 30 may be used.

The storage apparatus 10 includes the storage controller (Storage CTL) 100 coupled to the host computer 30 and a Disk Box 110 coupled to the storage controller 100.

The storage controller 100 controls the operation of the storage apparatus 10. The storage controller 100 includes a communication interface device, a memory, and a control device coupled to the communication interface and the memory. As the communication interface device, there are a Host I/F 101, which is a frontend communication interface device, and a Disk I/F 107, which is a backend communication interface device. As the memory, there is a cache memory 103. As the control device, there is a processor (e.g., a CPU (Central Processing Unit)) 104. The Host I/F 101, the cache memory 103, the processor 104, and the Disk I/F 107 are coupled to an internal network 102 by a dedicated coupling bus such as a PCI (Peripheral Component Interconnect) and are capable of communicating via the internal network 102.

The cache memory 103 is a DRAM such as a DDR 3 (Double Data Rate 3). The Host I/F 101 is an interface for coupling the storage apparatus 10 to the SAN 20. The internal network 102 is a network for coupling devices present on the inside of the storage apparatus 10. The internal network 102 includes a switch. Instead of the internal network 102, an ASIC (Application Specific Integrated Circuit) having a switch function and an assist function for DMA transfer, RAID calculation, and the like may be used. The processor 104 controls the entire storage apparatus 10. A plurality of the processors 104 may be present. In this case, the plurality of processors 104 may cooperate or share to control the storage apparatus 10. The cache memory 103 includes an area where computer programs and data necessary for the processor 104 to control the storage apparatus 10 are stored. The Disk I/F 107 is an interface for coupling the storage controller 100 and the Disk Box 110. The Disk Box 110 includes a plurality of Disks 11 of different types (nonvolatile physical storage devices such as HDDs 111 and SSDs 700). In the Disk Box 110, RGs are configured by pluralities of Disks of the same type. A logical volume serving as a storage space for user data is provided from each of the RGs. Note that, in the example shown in the figure, the HDDs 111 and the SSDs 700 are shown as the Disks 11 configuring the Disk Box 110. However, the Disks 11 may be only the SSDs 700.

Note that the number of units of the storage apparatus 10 and the number of units of the storage controller 100 are not limited to the example shown in the figure.

Figure 3:
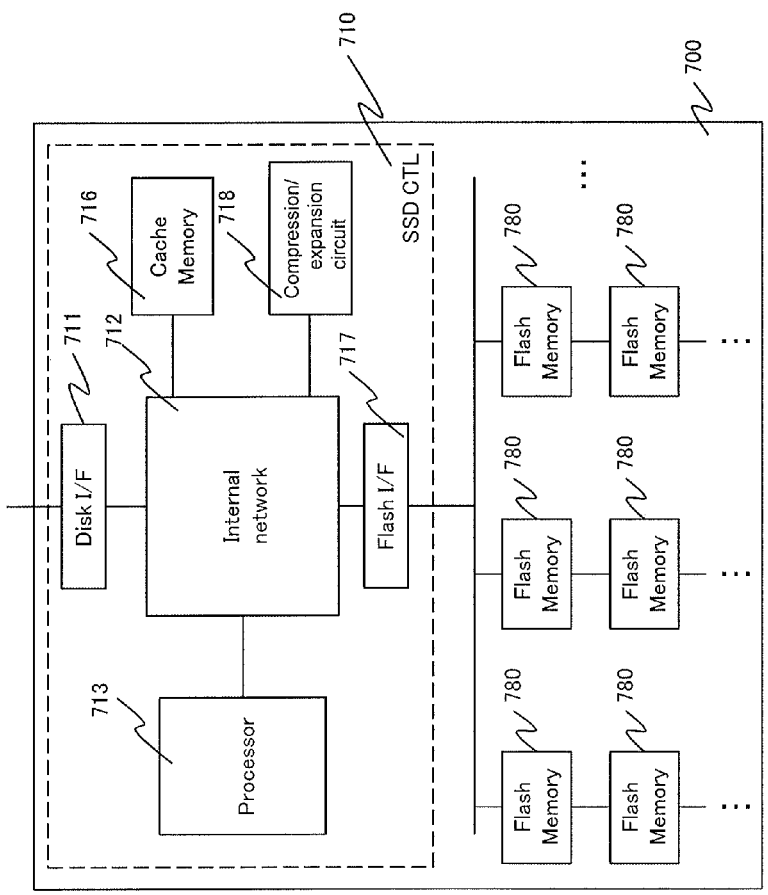
FIG. 3 is a diagram showing a configuration example of an SSD 700.

FIG. 3 is a diagram showing a configuration example of the SSD 700.

The SSD 700 includes a plurality of flash memories 780 and an SSD controller 710 coupled to the plurality of flash memories 780. The SSD controller 710 controls the operation of the SSD 700. The SSD controller 710 includes a communication interface device, a memory, a control device coupled to the communication interface device and the memory, and a hardware device that executes compression and expansion of data. As the communication interface device, there are a Disk I/F 711, which is a frontend communication interface device, and a Flash I/F 717, which is a backend communication interface device. As the memory, there is a cache memory 716. As the control device, there is a processor 713. As the hardware device that executes compression and expansion of data, there is a compression/expansion circuit 718. Note that a function of executing compression/expansion of data may be realized in terms of software by the processor 713 executing a dedicated program. The Disk I/F 711, the processor 713, the cache memory 716, the Flash I/F 717, and the compression/expansion circuit 718 are coupled to one another via an internal network 712.

The Disk I/F 711 is coupled to the Disk I/F 107 of the storage controller 100 by a dedicated coupling bus. The internal network 712 is a network for coupling devices. The internal network 712 may include a switch. The internal network 712 may be substituted by an ASIC having a switch function. The processor 713 controls the entire SSD 700. The cache memory 716 includes an area where a computer program and data necessary for the processor 713 to control the SSD 700 are stored. The Flash I/F 717 is an interface for coupling the SSD controller 710 and the flash memories 780.

In this embodiment, the SSD 700 is a semiconductor storage device including the plurality of flash memories 780 and the controller 710 that controls the plurality of flash memories 780. An exterior shape and the like of the SSD 700 are not limited to form factors. As the flash memory 780, a nonvolatile semiconductor memory such as NOR or NAND may be used. Instead of the flash memory 780, various semiconductor memories such as a MRAM (Magnetoresistive random access memory), which is a magnetic resistive memory, a ReRAM (resistance random access memory), which is a resistance-change type memory, and a FeRAM (Ferroelectric random access memory), which is a ferroelectric memory, may be used.

Figure 4:
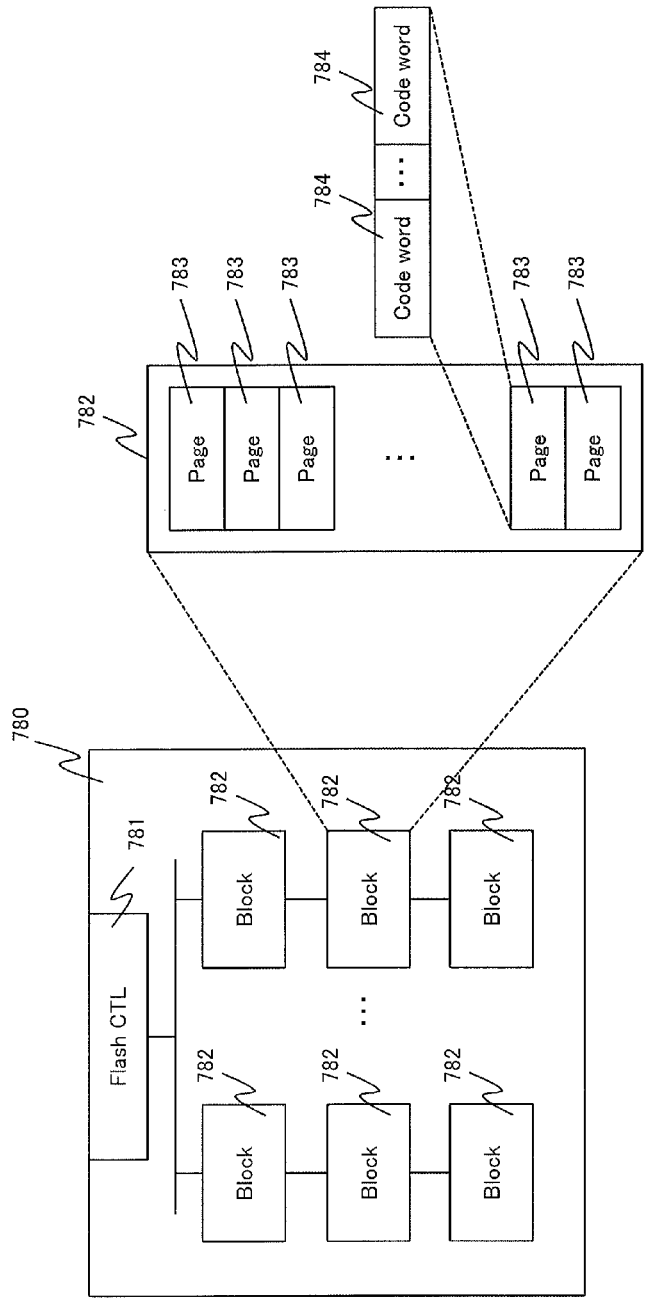
FIG. 4 is a diagram showing a configuration example of a flash memory 780.

FIG. 4 is a diagram showing a configuration example of the flash memory 780.

The flash memory 780 includes a plurality of blocks 782 and a flash memory controller (hereinafter, flash controller) 781 coupled to the plurality of blocks 782. The flash controller 781 controls the flash memory 780. Each of the blocks 782 is configured by a plurality of pages 783. RD of data from the flash memory 780 and WR of data in the flash memory 780 are executed in page units. Data erasing is executed in block units. The page 783 is configured by a plurality of Code words 784. Data stored by the host computer 30 and an ECC, which is an error correction code, for protecting the data are stored in the Code word 784.

The flash memory 780 is, for example, a flash memory of a NAND type. In the flash memory of the NAND type, data cannot be overwritten. Therefore, in the flash memory 780, when new data is written in the page 783 in which data is written, the data is erased and the new data is written in the erased page 783 in which the data is erased.

The SSD controller 710 performs number-of-times-of-erasing leveling processing on the plurality of blocks 782 in the SSD 700. The SSD controller 710 stores data having a small update frequency in the block 782 having a large number of times of erasing and stores data having a large update frequency in the block 782 having a small number of times of erasing to level the numbers of times of erasing of the blocks 782 in the SSD 700. Note that in the WR the SSD controller 710 may perform the leveling of the numbers of times of erasing by selecting a free block 782 having a small number of times of erasing and storing data in the free block 782. At this time, the SSD controller 710 may divide the plurality of blocks 782 into a plurality of groups according to the numbers of times of erasing and select, from a group having a small number of times of erasing, the block 782 in which data is stored. In this way, the numbers of times of erasing of the plurality of blocks 782 in the SSD 700 are leveled. Consequently, the extension of the life of the SSD 700 is achieved.

Figure 5:
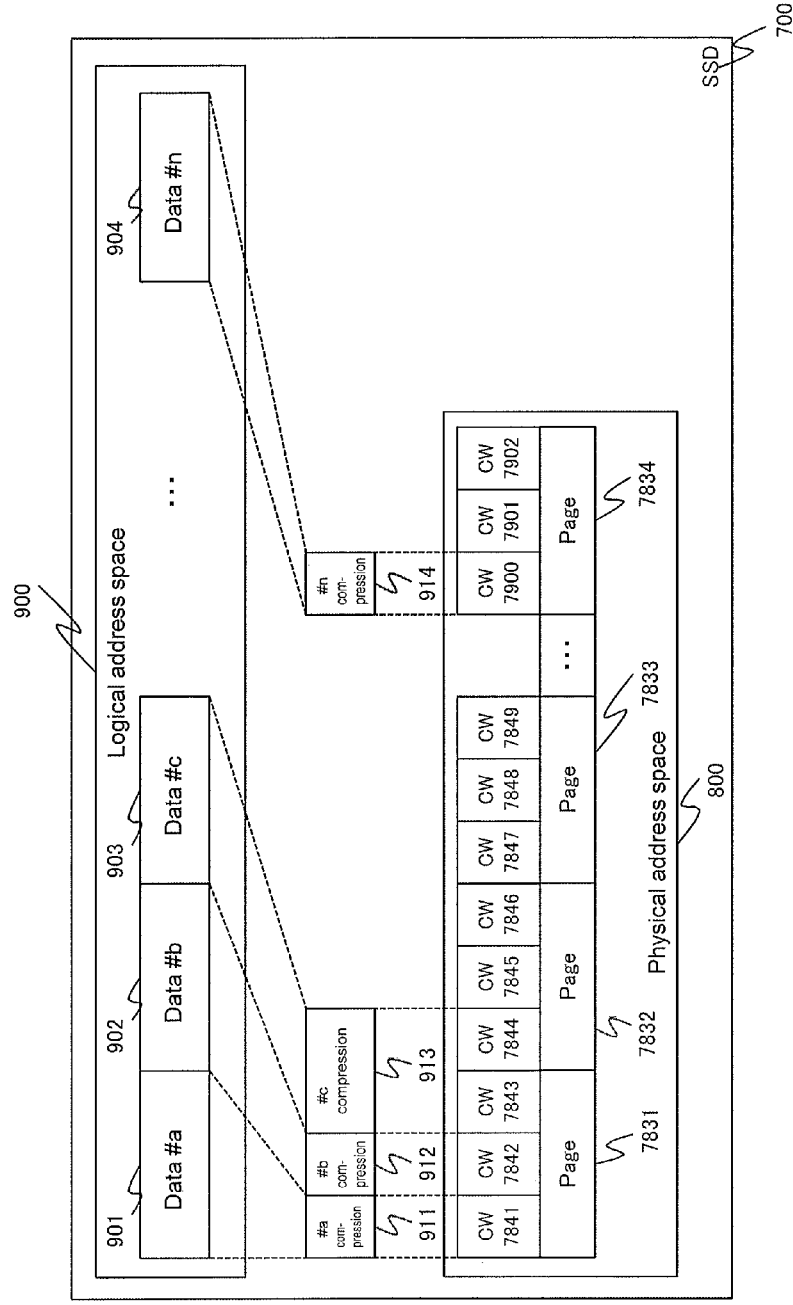
FIG. 5 is a diagram showing a configuration example of an address space of the SSD.

FIG. 5 is a diagram showing a configuration example of an address space of the SSD.

Concerning the SSD 700, a physical address space 800 and a logical address space 900 larger than the physical address space 800 are present. The physical address space 800 is an address space of a physical storage area in which actual data is stored. On the other hand, the logical address space 900 is a unique address space provided to the storage controller 100 by the SSD 700.

The SSD controller 710 divides the logical address space 900 into, for example, a plurality of areas (hereinafter, logical pages) 901, 902, 903, and 904 having the same size as a physical page size. In this embodiment, since the SSD 700 has a data compressing function, data of the logical page 901, data of the logical page 902, data of the logical page 903, and the data of the logical page 904 are respectively converted (compressed) into compressed data 911, compressed data 912, compressed data 913, and compressed data 914. Since a compression ratio changes according to a data pattern or the like, sizes of the compressed data obtained by converting the logical pages are not always fixed and are any sizes. The compressed data are respectively stored in physical pages in Code word (CW) units. In the example shown in the figure, the compressed data 911 is stored in a CW 7841, the compressed data 912 is stored in a CW 7842, the compressed data 913 is stored in a CW 7843 and a CW 7844, and the compressed data 914 is stored in a CW 7900.

In this way, in the SSD 700 having the data compressing function, the logical pages and the physical pages are not in a one-to-one relation. The physical pages are dynamically allocated to the compressed data after the compression actually stored in the FM 780. In the SSD 700, since the logical address space 900 is set larger than the physical address space 800, the storage controller 100 can write data equal to or larger than a physical storage capacity mounted on the SSD 700.

It is considered to which degree of size the logical address space 900 is set. In this embodiment, the size of the logical address space 900 is determined assuming that all write data are compressed at a best compression ratio (e.g., ⅛) at which all write data can be compressed in the compression/expansion circuit 718. In this case, the SSD 700 provides, to the storage controller 100, the logical address space 900 having a logical capacity eight times as large as a physical capacity mounted on the SSD 700. For example, if the best compression ratio is, for example, ⅛, the SSD 700 physically mounted with a capacity of 1 TB provides a logical capacity of 8 TB to the storage controller 100. Consequently, the storage controller 100 can store data equal to or more than the actual physical capacity of the SSD 700 simply by writing the data as in a HDD and an SSD that do not have the compressing function. In this case, since a compression ratio of the written data changes according to a data pattern and the like, actually, the compression ratio is sometimes worse (higher) than ⅛. Data of 8 TB cannot always be stored in the SSD 700 from the storage controller 100. In this way, a state in which the physical capacity of the SSD 700 is filled before the logical capacity of the SSD 700 is filled is called depleted state.

The storage controller 100 cannot write data at all in the SSD 700 that is in the depleted state. A WR command to the SSD 700 in the depleted state is error handling. This is because, as explained above, in the FM 780 of the NAND type, data cannot be simply overwritten. When new data is written in a page in which data is stored, it is necessary to erase the data and write the new data in an erased page in which the data is erased. In the SSD 700 in the depleted state, an erased page cannot be prepared.

Conversely, there is no limitation of WR in the SSD 700 in a non-depleted state. Data can be written in the entire logical address space 900.

Therefore, the storage controller 100 executes depletion avoidance processing explained below not to bring the SSD 700 into the depleted state and always keeps the SSD 700 in the non-depleted state.

The SSD controller 710 can realize a WL and the like in the SSD 700 by dynamically changing mapping of an address range (a logical storage area) configuring the logical address space 900 and an address range (a physical storage range) configuring the physical address space 800. Note that the processor 713 manages correspondence between the logical address space 900 and the physical address space 800 using a logical-physical conversion table 23100 explained below. In this embodiment, the storage controller 100 does not directly manage a logical-physical conversion table in the SSD 700. Therefore, unless the processor 713 of the SSD 700 performs notification about SSD internal information or the like to the storage controller 100, the storage controller 100 cannot grasp a correspondence relation between the logical address space 900 and the physical address space 800.

The capacity virtualization technique is explained.

The capacity virtualization technique (e.g., Thin Provisioning) is a technique for providing a virtual capacity larger than the physical capacity of the storage apparatus 10 to the host computer 30 side. The host computer 30 accesses a virtual logical volume (a virtual volume). In the capacity virtualization technique, when the storage apparatus 10 receives a WR request, a physical storage area is allocated to a virtual storage area (a virtual extent) at a WR destination of data of the WR request. In this embodiment, a unit of the physical storage area allocated in the capacity virtualization technique is set as an extent unit. A size of the extent may be various sizes from several MB to several GB.

Figure 6:
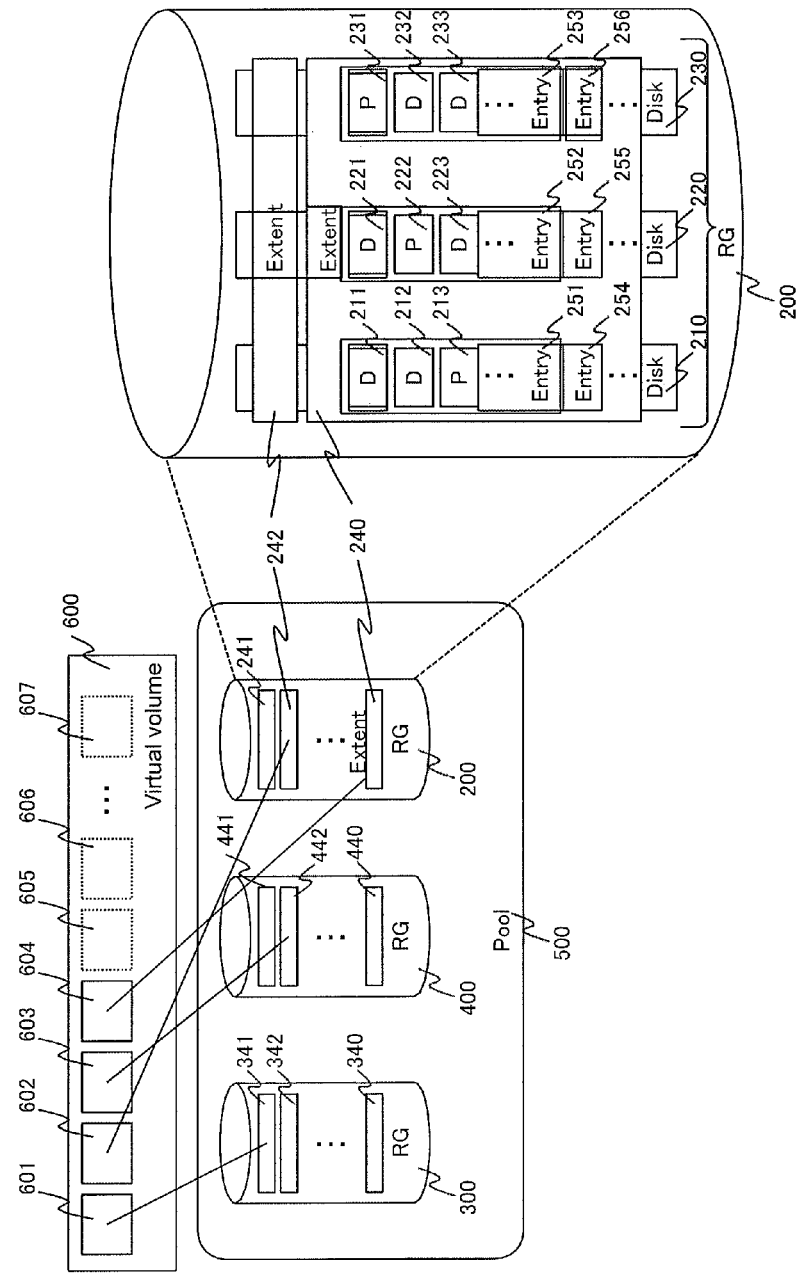
FIG. 6 is a schematic explanatory diagram of a capacity virtualization technique.

FIG. 6 is a schematic explanatory diagram of the capacity virtualization technique.

RGs (200, 300, and 400) are configured by the Disks 11 (e.g., SSDs 700) of the same type. A Pool 500 is configured on the basis of one or more RGs.

Extents (240, 241, 242, 340, 440, etc.) are storage areas (partial storage areas) obtained by dividing the Pool 500, that is, parts of the Pool 500. In an example shown in the figure, the Pool 500 is configured on the basis of three RGs, that is, the RG 200, the RG 300, and the RG 400. The RG 200 is explained below as an example.

The RG 200 is configured by a Disk 210, a Disk 220, and a Disk 230. The RG 200 constructs a RAID 5. Data (D in the figure) and Parity (P in the figure) are stored in the Disks (210 to 230).

A storage area based on the RG 200 is divided into a plurality of extents (240, 241, and 242). The storage area based on the RG 200 corresponds to the logical address space 900 provided by the plurality of SSDs 700.

The extent is a storage area having a size larger than the block 782 of the SSD 700. The size of the extent is, for example, N times (N is an integer equal to or larger than 2) as large as the block. The extent is configured by entries (e.g., entries 251, 252, 253, 254, 255, and 256), which are logical address spaces present in the Disks. Pluralities of Data and Parities are stored in the entry. In the example shown in the figure, data 211, data 212, parity 213, and the like are stored in the entry 251. Data 221, data 223, parity 222, and the like are stored in the entry 252. Data 232, data 233, parity 231, and the like are stored in the entry 253. In the entries 254, 255, and 256, similarly, pluralities of Data and Parities are stored. The entries 251 and 254 are constructed in the Disk 210. The entries 252 and 255 are constructed in the Disk 220. The entries 253 and 256 are constructed in the Disk 230.

In the example shown in the figure, the extent 240, the extent 241, and the extent 242 are created from a storage area of the RG 200. The extent 340, the extent 341, and the extent 342 are created from a storage area of the RG 300. The extent 440, the extent 441, and the extent 442 are created from a storage area of the RG 400.

A virtual volume 600 is a virtual logical volume for the host computer 30 to store user data. A capacity defined as a capacity of the virtual volume 600 can be set to a storage capacity larger than a total of capacities of the physical storage devices included in the storage apparatus 10. Note that the virtual volume 600 is configured by any number of virtual extents (601 to 607, etc.). A storage area of the virtual volume 600 is managed by a virtual address (a logical address configuring the virtual volume). A virtual extent is configured by a storage area of the virtual address divided into predetermined ranges. In the example shown in the figure, one extent is associated with one virtual extent. However, a plurality of extents may be associated with one virtual extent.

In the example shown in the figure, the virtual extents 601 to 604 indicated by solid lines are virtual extents to which extents are allocated from the RGs 200, 300, and 400. That is, the extent 341 is allocated to the virtual extent 601, the extent 242 is allocated to the virtual extent 602, the extent 442 is allocated to the virtual extent 603, and the extent 240 is allocated to the virtual extent 604. In the example shown in the figure, the virtual extents 605 to 607 indicated by broken lines are not virtual extents to which addresses designated as WR destinations of data belong. Therefore, extents are not allocated to the virtual extents 605 to 607.

Figure 7:
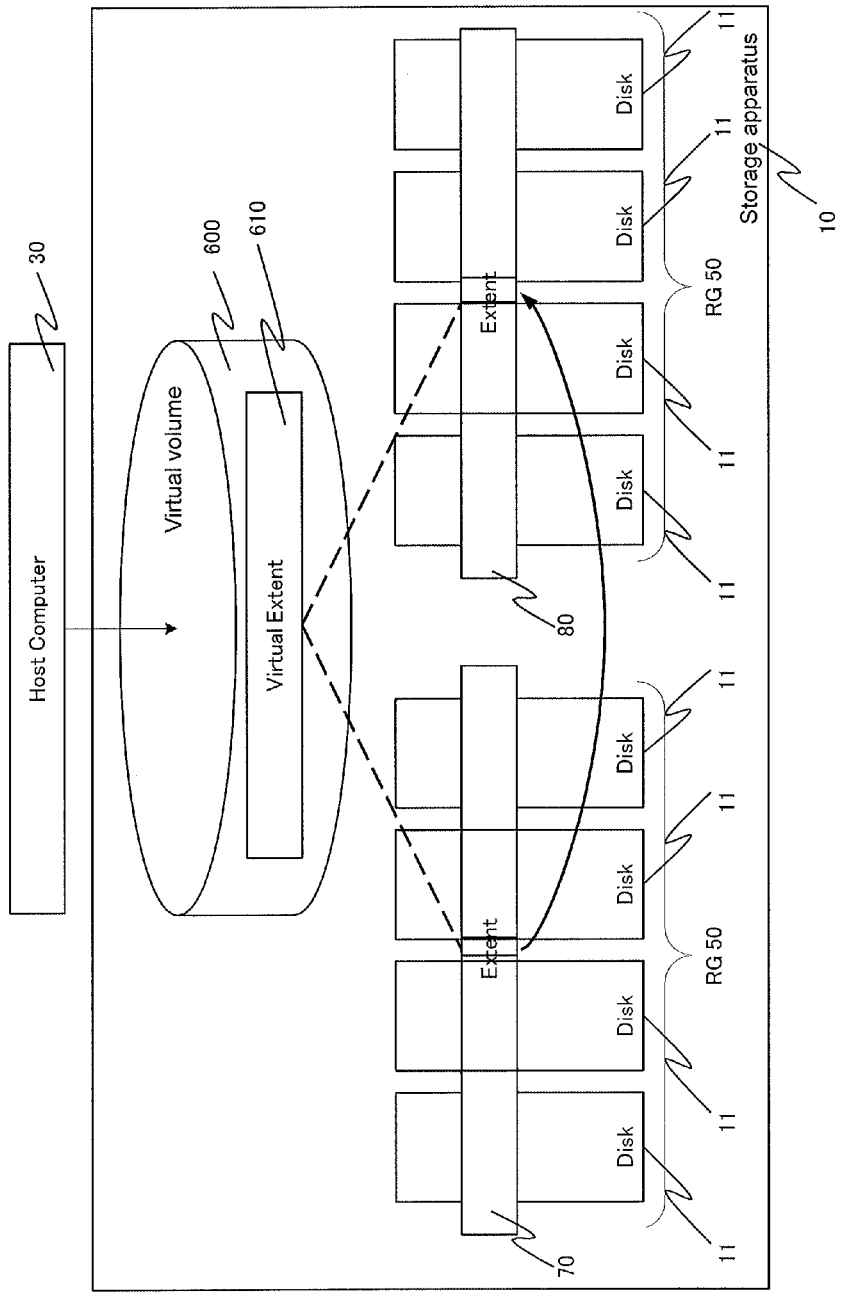
FIG. 7 is a diagram for explaining an overview of data access in the case in which data is migrated between RGs by data migration processing.

FIG. 7 is a diagram for explaining an overview of data access in the case in which data is migrated between the RGs by data migration processing. The data migration processing is executed in asynchronous processing for SSDs (explained below).

When data is migrated between the RGs, the host computer 30 has to change an access destination to data to an RG at a migration destination. However, since the address is converted using the virtual volume 600, the host computer 30 can access data at the migration destination without changing the access destination. That is, association with a virtual address of the virtual extent 610 is changed from a logical address of the extent 70 at a migration source to a logical address of an extent 80 at a migration destination by the storage controller 100. Therefore, even if the asynchronous processing for SSDs is executed, the host computer 30 does not need to change an address at the access destination by accessing the virtual volume 600. Note that, in this embodiment, the virtual volume is used for the address conversion. However, the address conversion is not limited to this. The address conversion may be performed without using the virtual volume.

Figure 8:
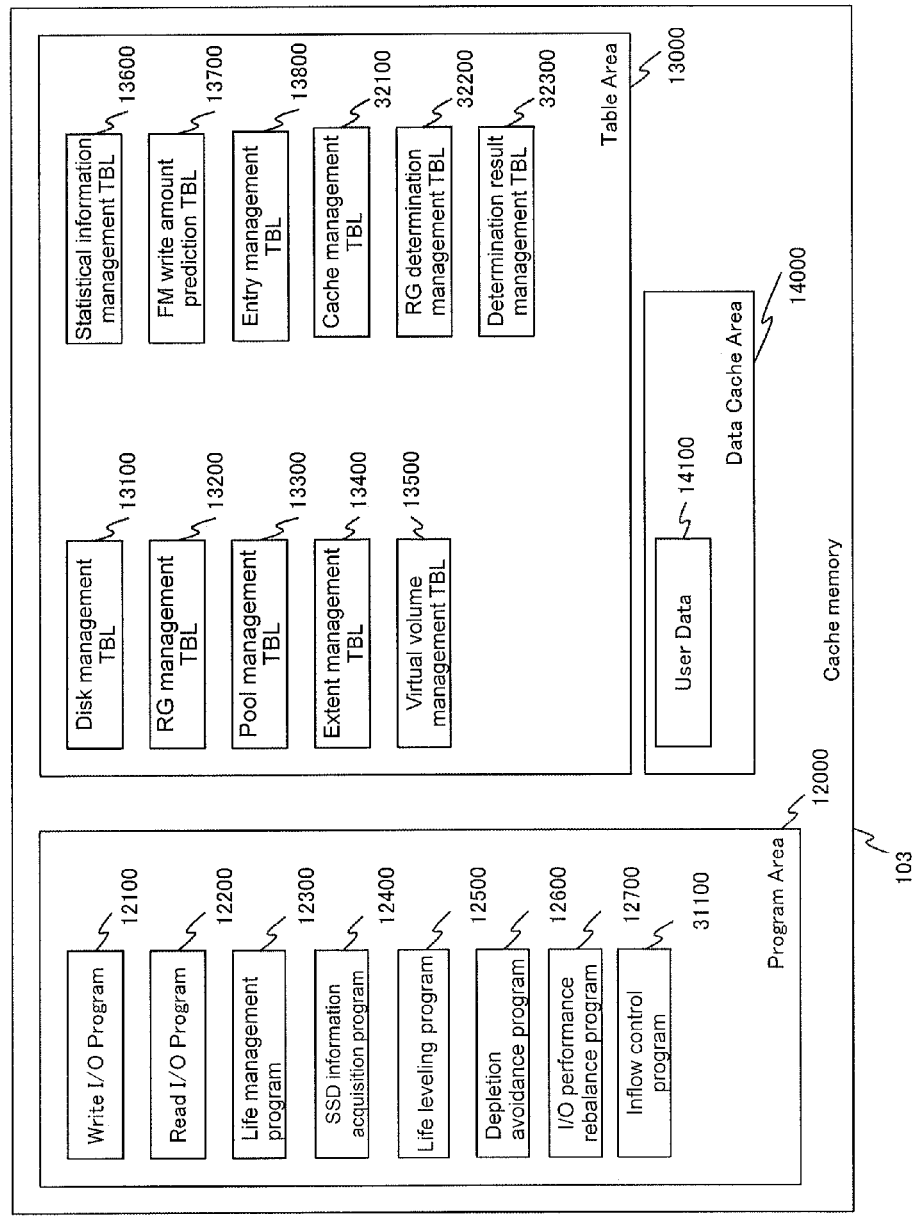
FIG. 8 is a diagram showing a configuration example of a cache memory 103.

FIG. 8 is a diagram showing a configuration example of the cache memory 103.

The cache memory 103 of the storage controller 100 includes a program area 12000, a table area 13000, and a data cache area 14000. The program area 12000 and the table area 13000 are areas where programs for controlling the storage apparatus 10 and various tables are stored. The data cache area 14000 is an area used to temporarily store user data.

The program area 12000 stores a Write I/O program 12100, a Read I/O program 12200, a life management program 12300, an SSD information acquisition program 12400, a life leveling program 12500, a depletion avoidance program 12600, an I/O performance rebalance program 12700, and an inflow control program 31100.

The Write I/O program 12100 is a program for processing a WR request from the host computer 30. The Read I/O program 12200 is a program for processing an RD request from the host computer 30. The life management program 12300 is a program for the processor 104 to manage lives of various Disks such as the SSD 700. The SSD information acquisition program 12400 is a program for acquiring internal information of the SSD 700. The life leveling program 12500 is a program for converting the life of the SSD 700 into an RG unit and executing life leveling of RGs. The depletion avoidance program 12600 is a program for calculating a depletion risk of the RGs from capacity information of the SSD 700 and executing depletion avoidance of an RG having high likelihood of depletion. The I/O performance rebalance program 12700 is a program for detecting from I/O statistical information of the RGs that a specific RG is a performance bottleneck and executing performance leveling. The inflow control program 31100 is a program for limiting WR data from the host computer 30 when determining that destage is impossible.

The table area 13000 includes a Disk management table (table is sometimes described as TBL) 13100, an RG management table 13200, a Pool management table 13300, an extent management table 13400, a virtual volume management table 13500, a statistical information management table 13600, an FM write amount prediction table 13700, an entry management table 13800, a cache management table 32100, an RG determination management table 32200, and a determination result management table 32300.

The Disk management TBL 13100 is a table that stores information concerning Disks stored in the Disk Box 110. The RG management TBL 13200 is a table that stores information concerning RAID groups. The Pool management TBL 13300 is a table that stores information concerning Pools. The extent management table TBL 13400 is a table that stores information concerning extents. The virtual volume management TBL 13500 is a table that stores information concerning virtual volumes. The statistical information management TBL 13600 is a table that stores various kinds of information concerning I/O performance of the storage apparatus 10. The FM write amount prediction TBL 13700 is a table used when predicting a data write amount inside an SSD in order to determine migration target data at the time when the processor 104 executes the life leveling processing. The cache management table 32100 is a table that stores information concerning the data cache area 14000. The RG determination management table 32200 is a table that stores information concerning determination of an RG. The determination result management table 32300 is a table that stores a determination result of the RG.

In the data cache area 14000, user data 14100 conforming to a WR request and an RD request is temporarily stored. The user data 14100 is data used by the host computer 30.

FIG. 9 is a diagram showing a configuration example of the Disk management table 13100.

The Disk management TBL 13100 manages information (depletion related information and residual life information) for performing depletion management and life management of the Disks mainly managed by the storage controller 100. The Disk management TBL 13100 includes, for each of the Disks, a Disk #13101, a Disk Type 13102, an information update date 13103, a residual guarantee period 13104, a predicted residual life 13105, a compressed configuration

13106, an FM read total amount 13107, an FM write total amount 13108, an average compression ratio 13109, a residual number of times of erasing 13110, an FM use amount 13111, a physical capacity 13112, and a logical capacity 13113.

The Disk #13101 is an identifier of a Disk and is a unique number. The disk Type 13102 represents a type of the Disk. As the type of the Disk, there are, for example, an SSD (SLC), an SSD (MLC), and a HDD. As the SSD, according to types of NAND flash memories in use, there are three types, that is, an SLC (Single Level Cell) type, an MLC (Multi Level Cell) type, and a TLC (Triple Level Cell) type. The SLC is a flash memory having high speed, a long life, and a low capacity and is capable of performing block erasing in several hundred thousand to several ten thousand times order. The MLC is a flash memory having low speed, a short life, and a large capacity and is capable of performing block erasing in several ten thousand to several thousand times order. The TLC has lower speed and shorter life compared with the MLC. However, the TLC is a large-capacity flash memory and is capable of performing block erasing in several thousand to several hundred times order.

The information update date 13103 represents a recent date when information concerning the Disk is updated (e.g., a date when the life information and the like are updated). The residual guarantee period 13104 indicates how many days of a guarantee period of the Disk decided by a vendor remain. In the example shown in the figure, the residual guarantee period 13104 is indicated as the number of days. The guarantee period of the Disk is a period (e.g., five years) in which the Disk is guaranteed to normally operate. The flash memory is deteriorated by an increase in the number of times of erasing due to write of data. When the flash memory reaches the life, R/W of data is impossible or a data retaining characteristic is markedly deteriorated. Therefore, a threshold is configured on the basis of the number of times of erasing, a total WR amount, and the like in advance as a period in which the Disk can be normally used. When a use period of the Disk exceeds the guarantee period, the Disk is replaced.

The predicted residual life 13105 indicates a remaining period in which the residual number of times of erasing 13110 of the SSD reaches zero. The predicted residual life 13105 is a numerical value predicted by the processor 104 (the life management program 12300). The predicted residual life 13105 is indicated as the number of days. The predicted residual life 13105 smaller than the residual guarantee period 13104 means that, since loads concentrate on a specific SSD because of, for example, variation of I/O, the SSD is in a higher load state than expected by the vendor and the SSD reaches the life before a use period guaranteed by the vendor. By executing the life leveling processing, it is possible to avoid concentration of WR on an RG including the specific SSD and achieve extension of the life of the SSD. The predicted residual life 13105 can be calculated on the basis of the information update date 13103, the FM read total amount 13107, the FM write total amount 13108, the residual number of times of erasing 13110, and the like. A method of calculating the residual life period is explained below.

The compressed configuration 13106 indicates whether a target Disk enables the data compressing function. When the data compressing function is enabled (in use), the compressed configuration 13106 is ON (or a numerical value (e.g., "1") equivalent to ON). When the data compressing function is disabled (not in use), the compressed configuration is OFF (or a numerical value (e.g., "0") equivalent to OFF). Note that the administrator of the storage apparatus 10 may be able to configure ON/OFF of the data compressing function via the control software or the like installed in the host computer 30.

The FM read total amount 13107 is an integrated value of read amounts generated in the SSD (amounts of data read from the flash memory in the SSD) and is updated on the basis of the SSD internal information. The FM write total amount 13108 is an integrated value of WR amounts generated in the SSD (amounts of data written in the flash memory in the SSD) and is updated on the basis of the SSD internal information. The average compression ratio 13109 is a numerical value indicating a percentage of a size reduced compared with an original size by compressing data inside the SSD. Note that the average compression ratio 13109 is an average of compression ratios of the SSDs and is updated on the basis of the SSD internal information.

The residual number of times of erasing 13110 indicates a value corresponding to the number of times of block erasing executable in the SSD. In this embodiment, the residual number of times of erasing 13110 is a ratio (a percentage) of the residual number of times of erasing to a predetermined erasable number of times and is updated on the basis of the SSD internal information. When the value of the residual number of times of erasing 13110 decreases to zero, this indicates that the numbers of times of erasing of all the blocks in the flash memory reaches the upper limit.

The FM read total amount 13107, the FM write total amount 13108, the average compression ratio 13109, and the residual number of times of erasing 13110 is updated on the basis of information acquired from the each of SSDs by the storage controller 100. The storage controller 100 acquires the information from the each of the SSDs using a general-purpose interface such as a S. M. A. R. T. (Self-Monitoring Analysis and Reporting Technology).

The FM use amount 13111 represents a data amount stored in the SSD and is updated on the basis of the SSD internal information. The physical capacity 13112 represents a physical capacity mounted on the SSD. The logical capacity 13113 represents a logical capacity with respect to the SSD. The logical capacity is a capacity based on a best compression ratio possible in the compression/expansion circuit 718 and is a capacity larger than the physical capacity. When the compressed configuration 13106 is ON, the storage controller 100 recognizes the logical capacity 13113 as the capacity of the SSD. When the compressed configuration 13106 is OFF, the storage controller 100 recognizes the physical capacity 13112 as the capacity of the SSD.

Note that, in the Disk management TBL 13100, concerning a Disk for which the depletion management is unnecessary (e.g., an SSD for which the compressed configuration 13106 is OFF), the average compression ratio 13109, the FM use amount 13111, and the logical capacity 13113 do not have to be set as acquisition targets by the processor 104. In the Disk management TBL 13100, concerning a Disk for which the life management is unnecessary (e.g., a HDD), the residual guarantee period 13104, the Predicted residual life 13105, the residual number of times of erasing 13110, and the FM use amount 13111 do not have to be set as acquisition targets by the processor 104.

FIG. 10 is a diagram showing a configuration example of the RG management table 13200.

The RG management TBL 13200 includes, for each of the RGs, an RG #13201, a Disk Type 13202, a RAID Level 13203, a RAID configuration 13204, a compressed configuration 13205, and a Disk #13206.

The RG #13201 is an identifier of the RG and is a unique number. The Disk Type 13202 represents a type of Disks configuring the RG. The RG is configured from Disks of the same type.

The RAID Level 13203 represents a RAID level of the RG. The RAID level is, for example, various values such as RAID 1+0, 1, 3, 4, 5, and 6. The RAID configuration 13204 represents the number of data Disks (Disks that store data) configuring a RAID and the number of parity Disks (Disks that store parities) configuring the RAID. The compressed configuration 13205 represents a configuration state of a compressing function with respect to the Disks configuring the RG. When the compressed configuration 13205 is ON, this indicates that compressed configuration of all the Disks configuring the RG is ON. When the compressed configuration 13205 is OFF, this indicates that the compressed configuration of all the Disks configuring the RG is OFF. The Disk #13206 represents numbers (Disk #) of the Disks configuring the RG. The Disk #13206 includes valid Disk #s as many as the number of Disks indicated by the RAID configuration 13204.

FIG. 11 is a diagram showing a configuration example of the Pool management table 13300.

The Pool management TBL 13300 includes, for each of the Pools, a Pool #13301, an RG #13302, an RG residual capacity 13303, and a Pool residual capacity 13304.

The Pool #13301 is an identifier of the Pool and is a unique number. The RG #13302 represents RG numbers of all the RGs configuring the Pool. The RG residual capacity 13303 represents the residual capacity of each of the RGs. The Pool residual capacity 13304 represents the residual capacity of the Pool and is equal to a total value of the RG residual capacities 13303 of the RGs configuring the Pool. When write of data occurs in an extent unallocated area of a virtual volume, the RG residual capacity 13303 and the Pool residual capacity 13304 are updated, by the processor 104 (the Write I/O program 12100), to values reduced by the write of the data.

FIG. 12 is a diagram showing a configuration example of the entry management table 13800.

The entry management TBL 13800 includes, for each of the Disks, a Disk #13801, an entry #13802, a size 13803, a Start-LBA 13804, a Last-LBA 13805, and an allocation destination extent #13806.

The Disk #13801 is an identifier (a Disk #) of the Disk and is a unique number. The entry #13802 is an identifier (an entry #) of an entry created in the Disk and is an identifier unique to each of the Disks. The size 13803 indicates a capacity (e.g., in Byte units) of the entry.

The Start-LBA 13804 and the Last-LBA 13805 indicate address spaces of which LBA to which LBA in order are used to create the entry. Specifically, the Start-LBA 13804 is a number of a start LBA of the address space of the entry and the Last-LBA 13805 is a number of a last LBA of the address space of the entry.

The allocation destination extent #13807 indicates whether this entry is already allocated to an extent. Specifically, when the entry is an entry already allocated to the extent, the allocation destination extent #13807 is an extent # at the allocation destination of the entry. When the entry is an entry unallocated to the extent, the allocation destination extent #13807 is "N/A" indicating that the entry is unallocated.

FIG. 13 is a diagram showing a configuration example of the extent management table 13400.

The extent management TBL 13400 includes, for each of the extents, an extent #13401, a size 13402, a Disk #13403, and an allocated entry #13404.

The extent #13401 is an identifier of the extent and is a unique number. The size 13402 represents a capacity (e.g., in Byte units) of the extent. The Disk #13403 and the allocated entry #13404 represent a Disk # of a Disk and an entry number # of an entry constructing the extent.

FIG. 14 is a diagram showing a configuration example of the virtual volume management table 13500.

The virtual volume management TBL 13500 includes, for each of the virtual volumes, an LU #13501, a virtual capacity 13502, an actual use capacity 13503, a virtual extent #13504, and an allocated extent #13505.

The LU #13501 is an identifier (an LU #) of the virtual volume and is a unique number. The virtual capacity 13502 is a virtual capacity of the virtual volume. The virtual capacity corresponding to the virtual capacity 13502 is provided to the host computer 30. The actual use capacity 13503 is a total value of capacities of extents actually allocated to the virtual volume.

The virtual extent #13504 is an identifier of a virtual extent included in the virtual volume. The example shown in the figure indicates that virtual extents #0 to n are included in the virtual volume of LU #0. The virtual extent #13504 is arranged in an ascending order. It is possible to calculate to which virtual extent # an LBA (Logical Block Address) designated by an R/W command issued from the host computer 30 corresponds. The allocated extent #13505 is an identifier (a number) of an extent allocated to the virtual volume. The storage controller 100 manages an allocation state of the extent for each of the virtual extents. In the example shown in the figure, an extent #0 is allocated to a virtual extent #0 and managed and an extent #100 is allocated to a virtual extent #1 and managed. Note that an extent #13505 corresponding to a virtual extent #13504 of a virtual extent to which an extent, which is a physical storage area, is unallocated is "-" indicating that an extent is not allocated. The example shown in the figure indicates that an extent is not allocated to a virtual extent of a virtual extent #n.

FIG. 15 is a diagram showing a configuration example of the statistical information management table 13600.

The statistical information management TBL 13600 is information (input/output amount information) concerning access states such as R/W to each of the entries and/or the extents. The storage controller 100 monitors an R/W state in entry units and configures the statistical information management TBL 13600. Note that the storage controller 100 can acquire the R/W access states to the extents by adding up values of respective kinds of information of entries belonging to each of the extents on the basis of content of the statistical information management TBL 13600.

The statistical information management TBL 13600 includes, for each of the Disks, a Disk #13601, an entry #13602, an average WR I/O Size 13603, an average RD I/O Size 13604, a WR ratio 13605, a WR amount 13606, and an RD amount 13607. Note that at least one of the information items 13601 to 13607 is sometimes referred to as statistical information.

The Disk #13601 is an identifier of the Disk and is a unique number. The entry #13602 is an identifier of an entry based on the Disk and is a unique number.

The average WR I/O Size 13603 and the average RD I/O Size 13604 are averages of I/O sizes of WR I/Os and RD I/Os occurred in the entry. The WR ratio 13605 is a ratio of WR commands to the I/O requests occurred in the entry. The WR amount 13606 and the RD amount 13607 indicate a total amount of WR data and a total amount of RD data occurred in the entry. Note that the WR amount 13606 and the RD amount 13607 are numerical values of recording of I/O content requested to the SSD by the storage controller 100. Therefore, the numerical values are values before compression. In this embodiment, since the monitoring of the statistical information is performed in entry units and/or extent units, monitoring loads can be further reduced than when the monitoring is performed in block units or page units of the flash memory.

The storage controller 100 monitors, on the basis of the virtual volume management TBL 13500, an access state concerning an extent being allocated. The statistical information is a cumulative value after the allocation of the extent to the virtual volume and a tendency of R/W. Note that the statistical information may be a cumulative value per unit time.

After the execution of the depletion avoidance processing, the life leveling processing, or the I/O performance rebalance processing, the statistical information of target extents of the respective kinds of processing may be reset. For example, in the life leveling processing, the storage controller 100 may reset only the statistical information concerning a migrated extent.

FIG. 16 is a diagram showing a configuration example of the FM WR amount prediction table 13700 in the first embodiment.

The FM WR amount prediction TBL 13700 is configured on the basis of the Disk management TBL 13100 and the statistical information management TBL 13600. The FM WR amount prediction TBL 13700 includes, for each of the Disks, a Disk #13701, an entry #13702, a WR amount 13703, a compression ratio 13704, and an FM WR predicted amount 13705.

The Disk #13701 is an identifier of the Disk and is a unique number. The entry #13702 is an identifier of the entry and is a unique number.

The WR amount 13703 indicates a total amount of WR data, a write destination of which is the entry. In prediction of an FM WR amount, the WR amount 13703 is updated on the basis of a value of the WR amount 13606 of the statistical information management TBL 13600. The compression ratio 13704 is an average of compression ratios in the Disk and is configured on the basis of the internal information acquired from the SSD. In the Prediction of the FM WR amount, the compression ratio 13704 is configured by copying a value of the average compression ratio 13109 of the Disk management TBL 13100. Note that, in this embodiment, since an average of compression ratios in Disk units is used, all of numerical values of all the entries are configured to the same value.

The FM WR predicted amount 13705 indicates a predicted amount (an FM WR predicted amount) of data actually written in the flash memory. In this embodiment, a value obtained by multiplying together the WR amount 13703 of a certain entry and the compression ratio 13704 of an entire Disk to which the entry belongs is regarded as an FM WR predicted amount occurred in the entry. An FM WR predicted amount in extent units can be acquired by calculating a total of FM WR predicted amounts of one or more entries configuring the extent.

For example, when a WR predicted amount to a certain extent is large, rewrite of data in a block frequently occurs in an SSD serving as a base of the extent. The number of times of erasing of the block increases. When the number of times of erasing of the block increases, the life of the SSD including the block decreases. When the life leveling is performed, the SSD life can be highly accurately leveled by determining a migration target extent on the basis of the WR predicted amount of the extent. Note that migration target data may be an entry.

FIG. 17 is a diagram showing a configuration example of the cache management table 32100.

The storage controller 100 divides the data cache area 14000 into a plurality of cache areas and manages the cache areas. The cache areas have a preset size.

One record of the cache management table 32100 includes a virtual address 32101 in the virtual volume, a cache area #32102 indicating a cache area corresponding to the virtual address, and a status 32103, which is a flag indicating whether the cache area is dirty.

The cache area may be a slot or may be a segment smaller than the slot. The storage controller 100 may reserve an area in segment units and manage the status 32103 in slot units.

FIG. 18 is a diagram showing a configuration example of the RG determination management table 32200.

One record of the RG determination management table 32200 includes an RG #32201 indicating an RG, an RG actual free capacity #32202 of the RG, a margin 32203 of the RG, a dirty data amount 32204 of the RG, and a pool #32205 indicating a pool to which the RG belongs.

FIG. 19 is a diagram showing a configuration example of the determination result management table 32300.

The determination result management table 32300 includes a system flag 32301 indicating a determination result of the entire storage apparatus 10 by storage state update processing explained below, a pool #32302 indicating pools, a pool flag 32303 indicating a determination results of each of the pools by the storage state update processing, an RG #32304 indicating each of RGs belonging to the pools, and an RG flag 32305 indicating determination results of each of the RGs by the storage state update processing.

The system flag 32301 is configured to ON if at least one RG flag 32305 is ON in the storage apparatus 10 during the storage state update processing. Otherwise, the system flag 32301 is configured to OFF. The pool flag 32303 of one pool is set to ON if at least one RG flag 32305 in the pool is ON during the storage state update processing. Otherwise, the pool flag 32303 is set to OFF. The RG flag 32305 of one RG is configured to ON if the RG satisfies a free condition during the storage state update processing. Otherwise, the RG flag 32305 is configured to OFF.

Figure 20:
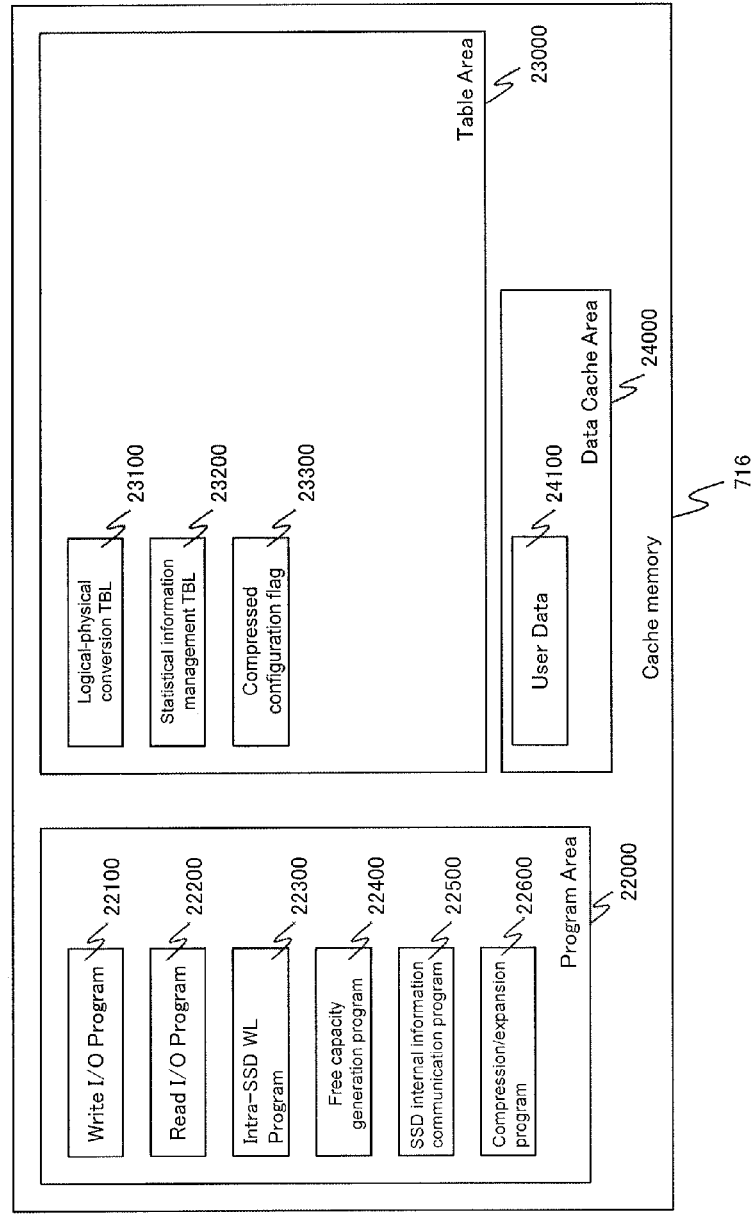
FIG. 20 is a diagram showing a configuration example of a cache memory 716 in the SSD 700.

FIG. 20 is a diagram showing a configuration example of the cache memory 716 in the SSD 700.

The cache memory 716 includes a program area 22000, a table area 23000, and a data cache area 24000.

The program area 22000 and the table area 23000 are areas where programs for controlling the SSD 700 and various tables are stored. The data cache area 24000 is an area for temporarily storing user data.

The program area 22000 includes a Write I/O program 22100, a Read I/O program 22200, an intra-SSD WL program 22300, a free capacity generation program 22400, an SSD internal information communication program 22500, and a compression/expansion program 22600.

The Write I/O program 22100 is a program for processing a WR request from the storage controller 100. The Read I/O program 22200 is a program for processing an RD request from the storage controller 100. The intra-SSD WL program 22300 is a program for executing WL inside the SSD. The free capacity generation program 22400 is a program for executing reclamation processing performed to avoid depletion of a free capacity of the SSD 700.

The SSD internal information communication program 22500 is a program for creating internal information of the SSD according to a request of the storage controller 100 and notifying the SSD internal information to the storage controller 100. The compression/expansion program 22600 is a program for the SSD controller 710 to execute compression/expansion of data using the processor 713. Note that the compression/expansion program 22600 may be configured to execute compression/expansion of data by controlling the compression/expansion circuit 718.

The table area 23000 includes a logical-physical conversion table 23100, a statistical information management table 23200, and a compressed setting flag 23300.

The logical-physical conversion TBL 23100 is a table for managing correspondence between a logical address space and a physical address space of the SSD 700. The statistical information management TBL 23200 is a table for managing statistical information of the SSD. The compressed configuration flag 23300 is a flag indicating whether compressed configuration of the SSD 700 is ON or OFF.

The data cache area 24000 is an area where the user data 24100 is stored. The user data 24100 is data written in a block and data read from the block.

FIG. 21 is a diagram showing a configuration example of the logical-physical conversion table 23100.

The logical-physical conversion table 23100 includes a Start-LBA 23101, a Block #23102, a Page #23103, and a Code Word (CW) #23104.

The Start-LBA 23101 indicates a start position of an LBA provided to the storage controller 100. Note that, since an I/O unit of the flash memory is a page, a numerical value of the Start-LBA 23101 is managed as a multiple of a page size. The Block #23102, the page #23103, and the CW #23104 indicate information (a block #, a page #, and a CW #) of a physical address space corresponding to the Start-LBA 23101. Note that, in this embodiment, since the SSD has the data compressing function, a logical address space extending over two or more pages could be mapped to one physical page. The example shown in the figure indicates that logical address spaces corresponding to an LBA 0 to an LBA 8191 and logical address spaces corresponding to an LBA 8192 to an LBA 16383 are stored in the same physical page (a Page #0 of a Block #0). Since the Start-LBA 23101 corresponds to the logical address space 900, there is also a logical address space to which WR from the storage controller 100 is absent and a physical page is not actually allocated. In this case, the Block #23102, the Page #23103, and the CW #23104 indicating a physical address space corresponding to the Start-LBA are invalid information.

FIG. 22 is a diagram showing a configuration example of the statistical information management table 23200 in the SSD.

In the statistical information management TBL 23200, information notified by the processor 713 in response to a request from the storage controller 100 is stored. The statistical information management TBL 23200 includes a write request total amount 23211, a read request total amount 23212, an FM write total amount 23213, an average compression ratio 23214, an FM read total amount 23215, and a residual number of times of erasing 23216.

The write request total amount 23211 and the read request total amount 23212 are respectively total amounts of data that the storage controller 100 requests the SSD 700 to write and data that the storage controller 100 requests the SSD 700 to read. The write request total amount 23211 and the read request total amount 23212 are respectively the same values as the total of the WR amount 13606 and the total of the RD amount 13607 in the statistical information management TBL 13600. The FM write total amount 23213 and the FM read total amount 23215 are total amounts of data actually written in the FM 780 and a total amount of data actually read from the FM 780. Note that these values include an R/W amount occurred inside the SSD in processing other than the R/W request from the storage controller 100 such as reclamation. The FM write total amount 23213 is the same value as the FM use amount 13111 of the Disk management TBL 13100.

The average compression ratio 23214 is an average of compression ratios of compressed data obtained by the data compression processing inside the SSD. The residual number of times of erasing 23216 is a value obtained by subtracting, from the largest number of times of erasing supported by the vendor, a total value of the numbers of times of erasing of an FM that occurs when data is written in the FM. A numerical value of the statistical information management TBL 23200 is updated when R/W or erasing of data occurs.

The operation of the storage controller 100 is explained below.

Figure 23:
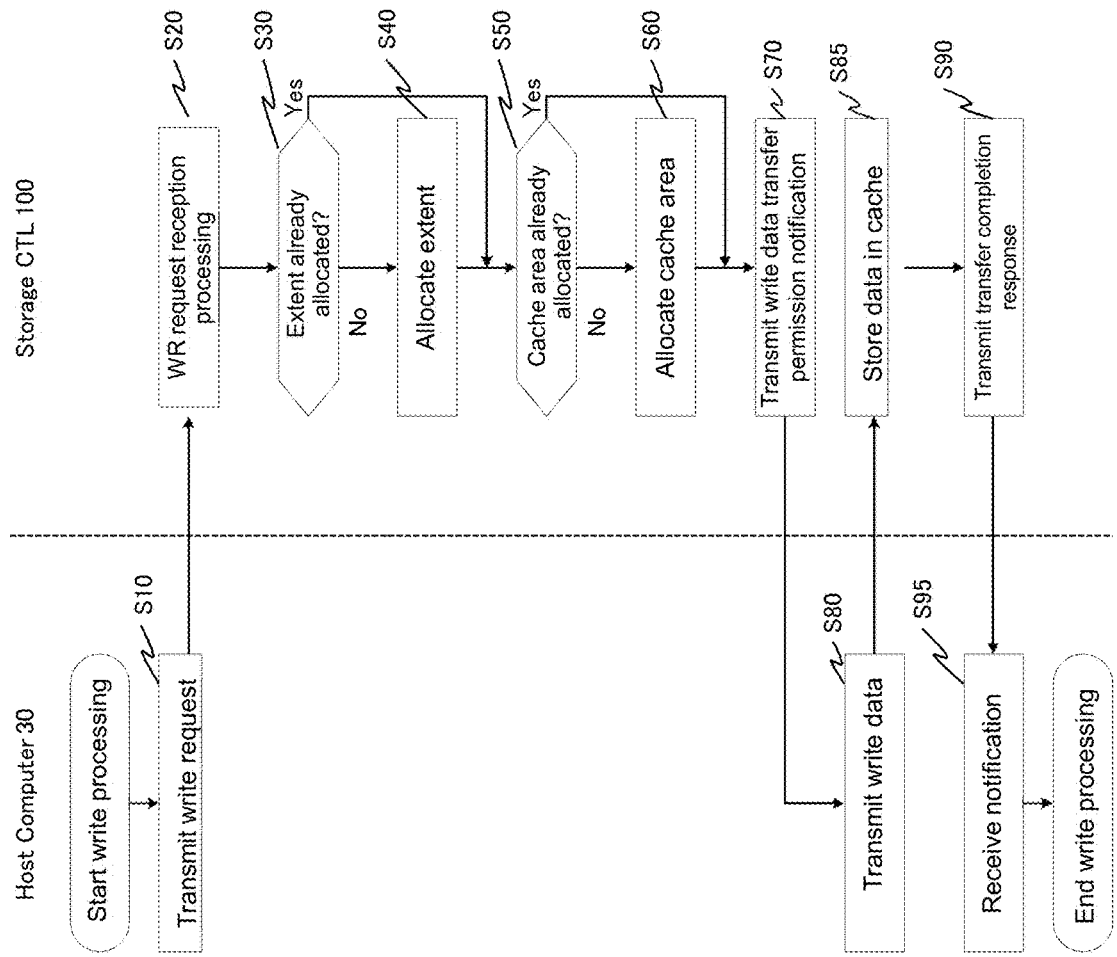
FIG. 23 shows write processing related to a write request from a host computer 30.

FIG. 23 shows write processing related to a write request from the host computer 30.

Note that, in the example shown in the figure, processing of the storage controller 100 is realized by executing the Write I/O program 12100. Processing of the SSD controller 710 is realized by executing the Write I/O program 22100.

The host computer 30 transmits a WR request to the storage controller 100 (S10). When receiving the WR request, the storage controller 100 executes WR request reception processing explained below (S20).

Thereafter, the storage controller 100 determines on the basis of the virtual volume management table 13500 whether an extent is already allocated to a WR destination range (an address range of a virtual volume) represented by the WR request (S30).

As a result of the determination, when an extent is already allocated (Yes in S30), the storage controller 100 shifts the processing to S50. When an extent is unallocated (No in S30), the storage controller 100 finds the unallocated extent and allocates the extent to a virtual extent in the WR destination range (S40). Note that, when transferring data from the cache memory 103 to the SSD 700, the storage controller 100 may allocate an extent.

Thereafter, the storage controller 100 determines whether a cache area is already allocated to the WR destination range (reservation of a cache area is requested) (S50).

As a result of the determination, when the cache area is already allocated (Yes in S50), the storage controller 100 shifts the processing to S70. When the cache area is unallocated (No in S50), the storage controller 100 finds the unallocated cache area and allocates the cache area to the WR destination range (S60).

Thereafter, the storage controller 100 transmits a WR data transfer permission notification to the host computer 30 to urge WR data transmission (S70).

Subsequently, the host computer 30 transmits WR data in response to the WR data transfer permission notification (S80). The storage controller 100 receives the WR data and stores the received WR data in the cache memory 103 (S85). Thereafter, the storage controller 100 transmits the transfer completion response to the host computer 30 (S90).

When receiving the transfer completion response from the storage controller 100, the host computer 30 ends the write processing (S95).

Figure 24:
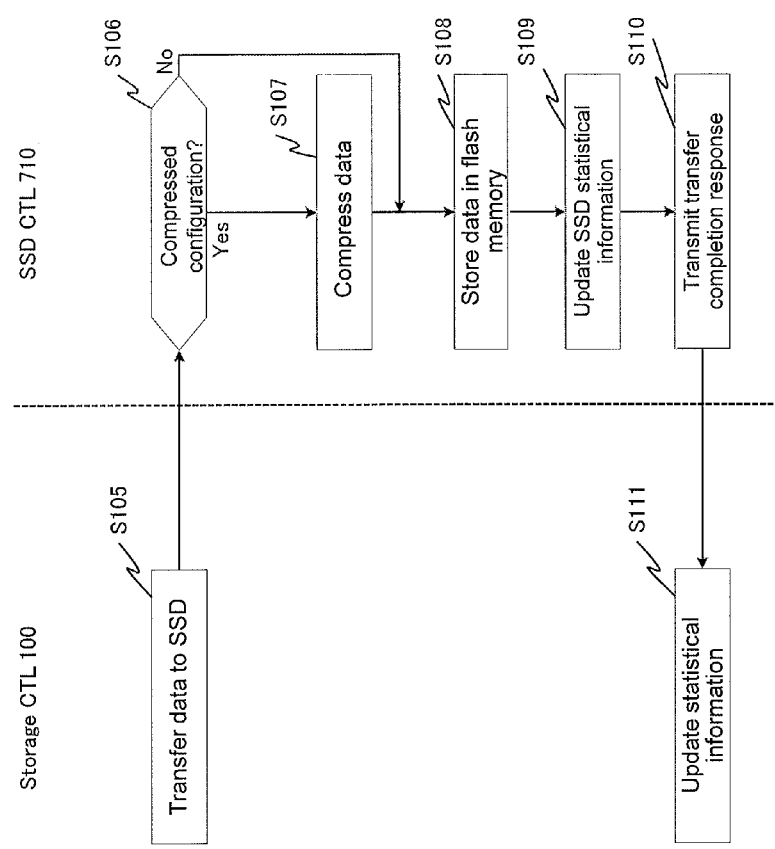
FIG. 24 shows destage processing.

FIG. 24 shows destage processing.

When a condition that, for example, the number of allocated cache areas exceeds a preset cache area number threshold is satisfied, the storage controller 100 executes the destage processing.

The storage controller 100 transmits data stored in the cache memory 103 and a WR request concerning the data to the SSD controller 710 of the SSD 700 at a storage destination of the data (S105).

The SSD controller 710 receives the data and the WR request from the storage controller 100, refers to the compressed configuration flag 23100 of the SSD controller 710, and determines whether data compression is enabled (S106). As a result, when the data compression is enabled (Yes in S106), the SSD controller 710 compresses the data (S107), refers to the logical-physical conversion TBL 23100, determines an FM position (a Block #, a Page #, and a CW #) of the storage destination of the data, and stores the data in the determined FM position (S108).

On the other hand, the data compressed configuration is disabled (No in S106), the SSD controller 710 does not perform the data compression, determines an FM position of the storage destination of the data on the basis of the logical-physical conversion TBL 23100, and stores the data in the determined FM position (S108).

After executing S108, the SSD controller 710 updates the write request total amount 23211, the FM write total amount 23213, the average compression ratio 23214, and the residual number of erasing 23216 of the statistical information management TBL 23200 concerning the received data (S109). Subsequently, the SSD controller 710 transmits a transfer completion response to the storage controller 100 as a response to the WR request received in S106 (S110).

When receiving the transfer completion response from the SSD controller 710, the storage controller 100 updates the average WR I/O Size 13603, the WR ratio 13605, and the WR amount 13606 of the statistical information management TBL 13600 (S111) and ends this sequence.

Figure 25:
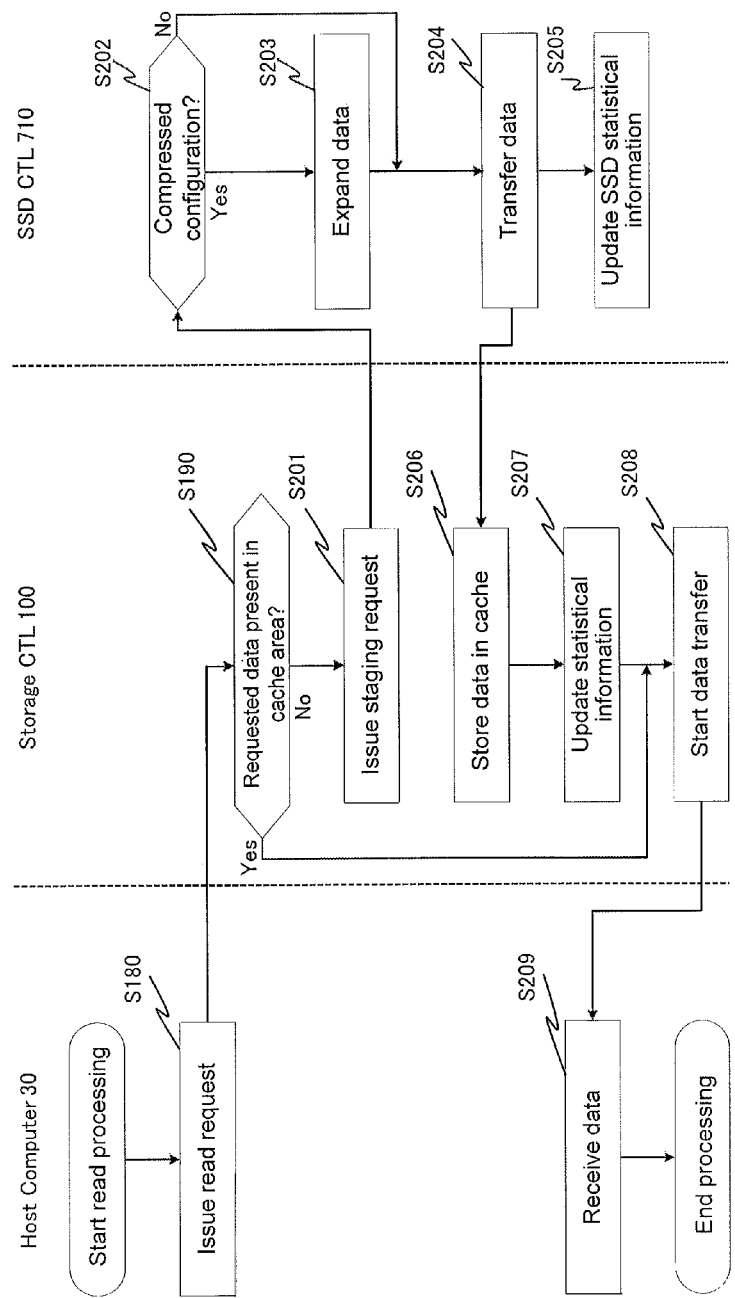
FIG. 25 shows read processing related to a read request from the host computer 30.

FIG. 25 shows read processing related to a read request from the host computer 30.

Note that processing of the storage controller 100 in an example shown in the figure is realized by executing the Read I/O program 12200. Processing of the SSD controller 710 is realized by executing the Read I/O program 22200.

The host computer 30 transmits an RD request for data to the storage controller 100 (S180).

The storage controller 100 receives the RD request for data and determines whether there is a cache area allocated to an RD range (an address range of a virtual volume) indicated by the RD request (the requested data is present in the cache area) (S190).

When the cache area is allocated (Y in S190), the storage controller 100 shifts the processing to S208. When the cache area is not allocated (N in S190), the storage controller 100 allocates the cache area, specifies the SSD 700 serving as a base of an extent, and transmits an RD request (a staging request) for data to the SSD controller 710 of the specified SSD 700 (S201).

The SSD controller 710 receives the RD request for data and performs, on the basis of the logical-physical conversion TBL 23100, processing for specifying a physical address range corresponding to a logical address range conforming to the RD request and reading data from the physical address range (one or more pages). In this processing, the SSD controller 710 confirms whether data compression is enabled (S202). When the data compression is enabled (Yes in S202), the SSD controller 710 performs expansion on the read data (S203) and transmits the expanded data to the storage controller 100 (S204). On the other hand, when the data compression is not enabled (No in S202), the SSD controller 710 transmits the read data to the storage controller 100 without expanding the data (S204).

Following S204, the SSD controller 710 updates the read request total amount 23212 and the FM read total amount 23215 of the statistical information management TBL 23200 (S205).

When receiving the data from the SSD controller 710 as a response to the RD request transmitted in S201, the storage controller 100 stores the received data in the cache memory 103 (S206) and updates the average RD I/O Size 13604, the WR ratio 13605, and the RD amount 13607 of the statistical information management TBL 13600 (S207). Thereafter, the storage controller 100 transmits the data stored in the cache memory 103 in S206 to the host computer 30 (S208).

When receiving data, the data from the storage controller 100 as a response to the RD request transmitted in S200, the host computer 30 ends the read processing (S209).

Note that, after storing the data in the cache memory 103 in S85 of the write processing, the storage controller 100 may perform the destage processing and transmit the transfer completion response to the host computer 30 after the destage processing. In this case, the storage controller 100 may not use a margin or may use a preset value as the margin.

Figure 26:
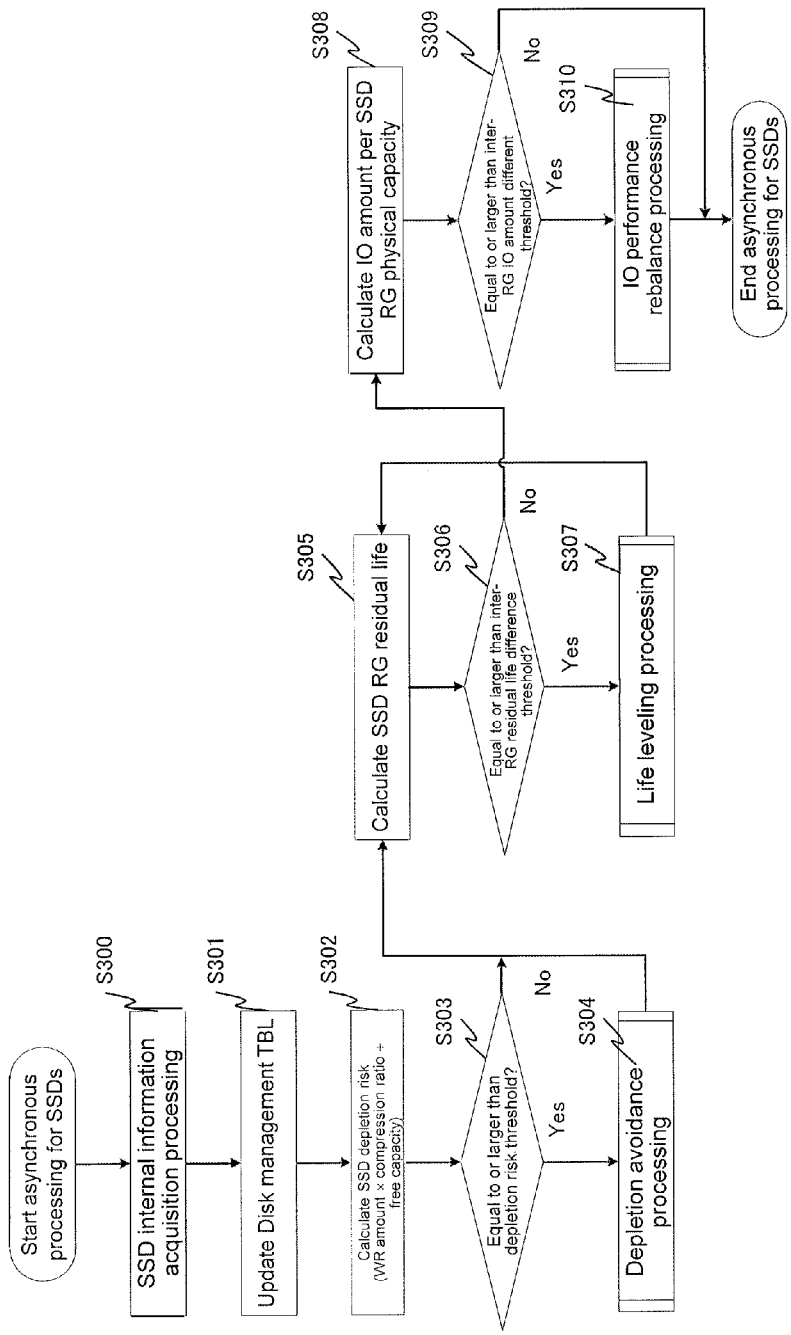
FIG. 26 shows asynchronous processing for SSDs.

FIG. 26 shows the asynchronous processing for SSDs.

The storage controller 100 executes SSD internal information acquisition processing (explained below) on the SSD controllers 710 in every preset SSD internal information acquisition cycle asynchronously with an I/O request (S300). The storage controller 100 transmits an SSD internal information acquisition command to the SSD controller 710 and receives an execution result notification command, which is a response to the SSD internal information acquisition command, from the SSD controller 710. Information acquired in the processing in S300 is, for example, the data (the FM write total amount 23213, the average compression ratio 23214, the FM read total amount 23215, and the residual number of times of erasing 23216) stored in the statistical information management TBL 23200.

The storage controller 100 updates the Disk management TBL 13100 on the basis of the acquired internal information (S301). Specifically, the storage controller 100 updates the FM write total amount 13108 and the FM use amount 13111 on the basis of the MF write total amount 23213, updates the FM read total amount 13107 on the basis of the FM read total amount 23215, updates the average compression ratio 13109 on the basis of the average compression ratio 23214, and updates the residual number of times of erasing 13110 on the basis of the residual number of times of erasing 23216.

Subsequently, the storage controller 100 calculates a depletion risk of the Disk on the basis of the information of the Disk management TBL 13100 (S302). The depletion risk is an index for determining depletion likelihood of the Disk. In this embodiment, a higher numerical value indicates higher depletion likelihood. The depletion risk is calculated by, for example, WR amount in the Disk×average compression ratio÷free capacity. That is, the depletion risk is higher as the WR frequency is higher, the compression ratio is lower, and the free capacity is less. The WR amount in the Disk is a total in Disk units of the WR amount 13606 of the statistical information management TBL 13600. The average compression ratio is the average compression ratio 13109 of the Disk management TBL 13100. The free capacity can be calculated by subtracting the FM use amount 13111 from the physical capacity 13112 of the Disk management TBL 13100.

Subsequently, the storage controller 100 determines whether the depletion risk is equal to or larger than a threshold and determines whether to execute the depletion avoidance processing (S303). Note that the threshold may be configured by the administrator of the storage apparatus 10 via the control software or the like installed in the host computer 30. When determining that the depletion risk is equal to or larger than the threshold and the depletion avoidance processing is necessary (Yes in S303), the storage controller 100 executes the depletion avoidance processing (explained below) (S304). After the end of the depletion avoidance processing, the storage controller 100 advances the processing to S305. On the other hand, when determining that the depletion risk is not equal to or larger than the threshold and the depletion avoidance processing is unnecessary (No in S303), the storage controller 100 advances the processing to S305.

In S305, the storage controller 100 calculates the residual life in RG units in order to perform necessity determination of life leveling processing (S305). The residual life in RG units may be set as a worst value among the residual lives of the SSDs configuring the RG or may be set as an average of the residual lives of the SSDs. A method of calculating the residual lives of the SSDs is explained below. The storage controller 100 stores the calculated residual lives of the SSDs in the predicted residual life 13105 of the Disk management TBL.

Subsequently, the storage controller 100 calculates a difference of the residual lives between RGs, determines whether the difference is equal to or larger than the threshold, and determines whether to execute the life leveling processing (S306). Note that the threshold may be configured by the administrator of the storage apparatus 10 via the control software or the like installed in the host computer 30. Note that the storage controller 100 may determine whether to execute the life leveling processing according to, for example, whether there is an SSD that reaches the life earlier than the guarantee period (whether there is an SSD having the predicted residual life 13105 smaller than the residual guarantee period 13104).

As a result, when determining that the difference is equal to or larger than the threshold and the life leveling processing is necessary (Yes in S306), the storage controller 100 executes the life leveling processing (explained below) (S307). When the life leveling processing ends, the storage controller 100 proceeds to S305 again. Consequently, the residual life of the SSD RG is calculated again concerning a state after the life leveling processing. In S306, the storage controller 100 determines whether the difference of the residual lives is equal to or larger than the threshold.

On the other hand, when determining that the difference is not equal to or larger than the threshold and the life leveling processing is unnecessary (No in S306), the storage controller 100 calculates an I/O amount per RG physical capacity in order to perform necessity determination of the I/O performance rebalance processing (S308). The I/O amount per RG physical capacity is calculated by, for example, I/O amount of the RG×average compression ratio RG physical capacity. The I/O amount of the RG can be calculated by calculating I/O amounts of the SSDs from the WR amount 13606 and the RD amount 13607 of the statistical information management TBL 13600 and adding up I/O amounts of the SSDs configuring the RG. The average compression ratio is set to, for example, a numerical value of a worst compression ratio among compression ratios of the RGs from the average compression ratio 13109 of the Disk management TBL 13100. The RG physical capacity can be calculated by adding up physical capacities of SSDs configuring the RG from the physical capacity 13112 of the Disk management TBL 13100.

Subsequently, the storage controller 100 calculates a difference of I/O amounts per physical capacity between the RGs, determines whether the difference is equal to or larger than a threshold, and determines whether to execute the I/O performance rebalance processing (S309). As a result, when the difference is equal to or larger than the threshold (Yes in S309), the storage controller 100 executes the I/O performance rebalance processing (explained below) (S310). After the end of the I/O performance rebalance processing, the storage controller 100 ends the asynchronous processing for SSDs. On the other hand, when the difference is smaller than the threshold (No in S309), the storage controller 100 ends the asynchronous processing for SSDs.

Note that the asynchronous processing for SSDs may be executed at any timing, may be executed at a fixed interval (e.g., every other day), or may be executed at timing when a specific command is received. Further, the asynchronous processing for SSDs may be executed by the user instructing an execution opportunity of this processing from the control software of the host computer 30.

According to the example shown in the figure, the priority degree of the depletion avoidance processing is the highest, the priority degree of the life leveling processing is the second highest, and the priority degree of the I/O performance rebalance processing is the lowest. The kinds of processing are performed in the descending order of the priority degrees. However, the respective priority degrees of the kinds of processing may be different from the priority degrees shown in the figure. For example, the priority degree of the I/O performance rebalance processing may be higher than the priority degree of the life leveling processing.

There are a plurality of kinds of data arrangement control processing (processing in which data migration between storage devices occurs) such as the depletion avoidance processing, the life leveling processing, and the I/O performance rebalance processing. Before performing any one of the kinds of data arrangement control processing (target data arrangement control processing), the storage controller 100 may determine whether a condition for skipping the data arrangement control processing (the data arrangement control processing performed earlier) having the priority degree higher than the priority degree of the target data arrangement control processing remains satisfied even if the target data arrangement control processing is performed. "A condition for skipping the data arrangement control processing having the higher priority degree remains satisfied" means that a condition that should be satisfied by the data arrangement control processing having the higher priority degree remains satisfied, for example, the depletion risk remains smaller than the threshold thereof, the inter-RG residual life difference remains smaller than the threshold thereof, or the inter-RG 10 amount difference remains smaller than the threshold thereof. When a result of the determination is affirmative, the storage controller 100 may perform the target data arrangement control processing. When the result of the determination is negative, the storage controller 100 may skip the target data arrangement control processing (does not have to perform the target data arrangement control processing).

Figure 27:
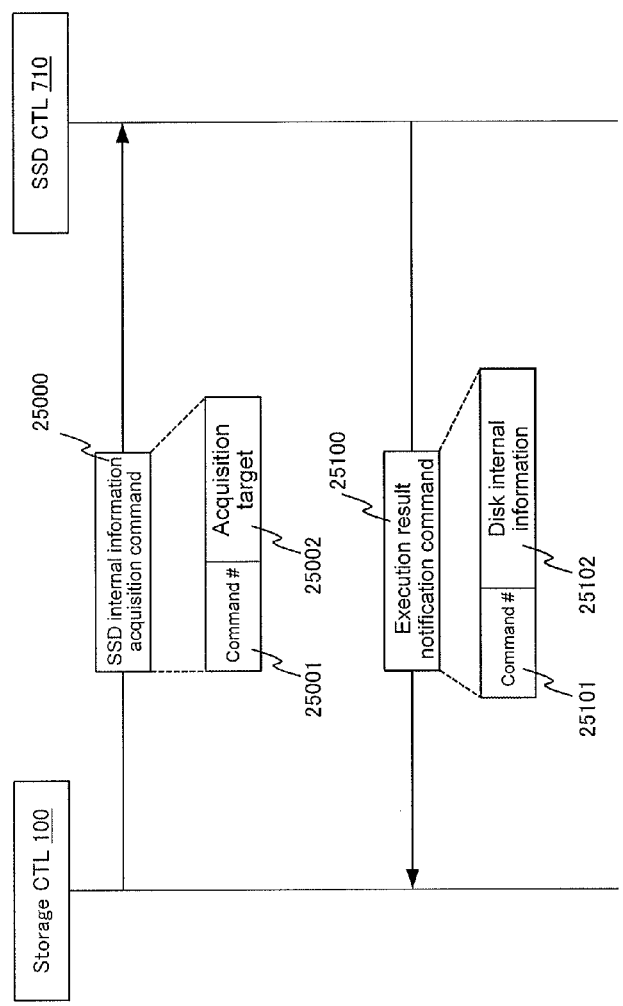
FIG. 27 shows SSD internal information acquisition processing.

FIG. 27 shows the SSD internal information acquisition processing.

In S300 explained above, the storage controller 100 executes the SSD internal information acquisition processing. The figure shows configuration examples of an SSD internal information acquisition command 25000 and an execution result notification command 25100, which is a response to the SSD internal information acquisition command 25000.

The SSD internal information acquisition command 25000 is a command transmitted to the SSD 700 by the storage controller 100.

The SSD internal information acquisition command 25000 includes, for example, a command #25001 and an acquisition target 25002. The command #25001 is an identifier (a command #) of a command. The acquisition target 25002 is a target item that the storage controller 100 desires to acquire from the SSD. Specifically, the acquisition target 25002 indicates a value of which item is necessary among items included in the statistical information management TBL 23200 of the SSD 700.

The execution result notification command 25100 is a command transmitted to the storage controller 100 by the SSD 700. The execution result notification command 25100 includes response content to the SSD internal information acquisition command 25000. The execution result notification command 25100 includes, for example, a command #25101 and Disk internal information 25102. The command #25101 is the command #25001 indicating to which request command a response corresponds and corresponding to the request command. The Disk internal information 25102 is a replay value to content designated by the acquisition target 25002. This value is a value calculated or copied from the statistical information management TBL 23200 of the SSD.

In the SSD internal information acquisition processing, the storage controller 100 transmits the SSD internal information acquisition command 25000 to the SSDs 700 to acquire the FM use amount 13111, the physical capacity 13112, and the like, subtracts the FM use amount 13111 from the physical capacity 13112 to thereby calculate an SSD actual free capacity, which is a physical free capacity size of each of the SSDs 700, calculates an RG actual free capacity, which is a total of SSD actual free capacities of each of the RGs on the basis of the RG management table 13200, and stores the RG actual free capacity in the RG determination management table 32200. Note that the SSD 700 may manage the SSD actual free capacity and the storage controller 100 may acquire the SSD actual free capacity from the SSD 700.

According to the SSD internal information acquisition processing, the storage controller 100 can periodically acquire states of the SSDs 700. Consequently, the storage controller 100 can acquire a data amount compressed by the SSD 700 and stored in the SSD 700 and a free physical capacity (an actual free capacity) of the SSD 700.

Figure 28:
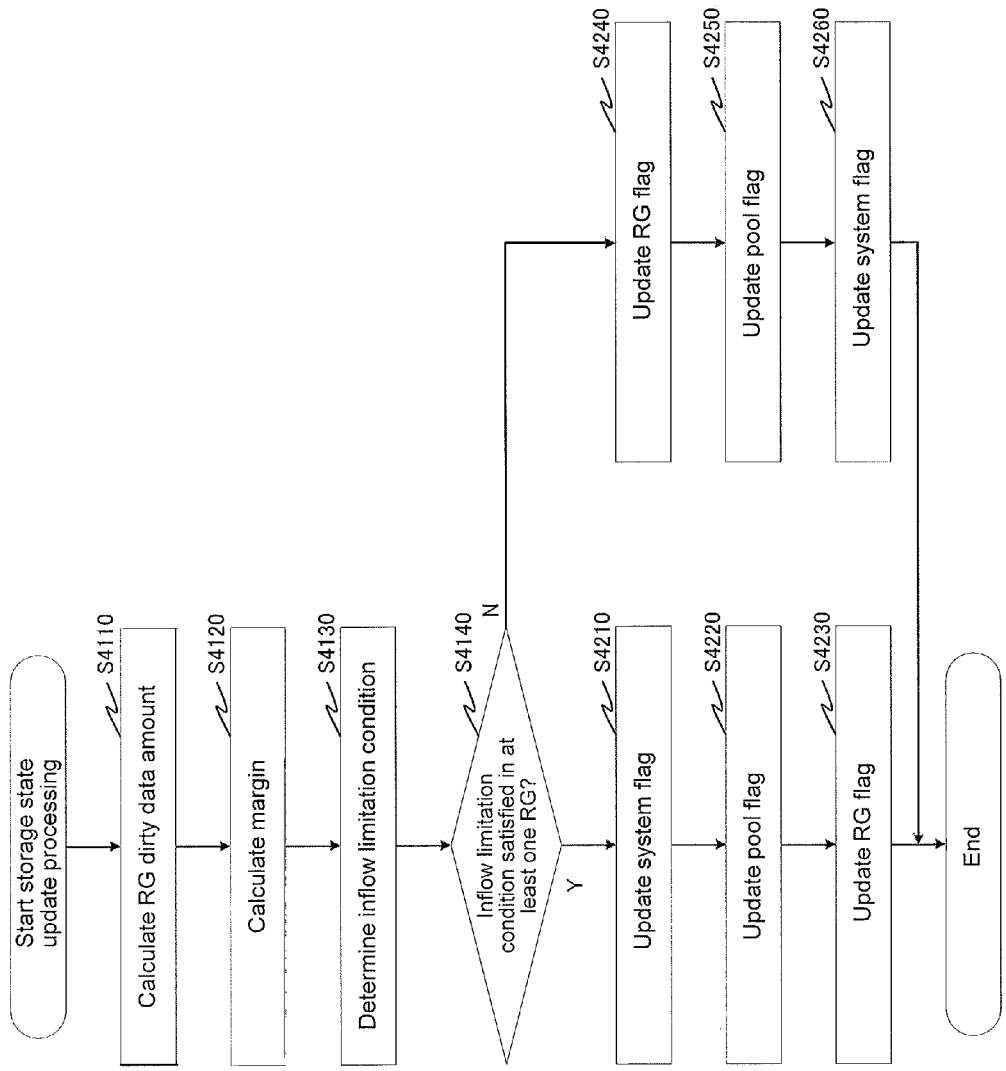
FIG. 28 shows storage state update processing.

FIG. 28 shows the storage state update processing.

The storage controller 100 executes the storage state update processing according to the inflow control program 31100 asynchronously with an I/O request every time a preset storage state update cycle elapses. The storage state update cycle may be shorter than the SSD internal information acquisition cycle explained above.

First, the storage controller 100 acquires, from the cache management table 32100, with respect to each of the RGs, the number of cache areas, statuses of which are dirty, among cache areas corresponding to the RG, calculates, on the basis of the number of cache areas, an RG dirty data amount A, which is a dirty data amount of the cache areas corresponding to the RG, and stores the RG dirty data amount A in the RG determination management table 32200 (S4110).

Thereafter, the storage controller 100 calculates, with respect to each of the RGs, a margin B indicating a data amount likely to be destaged to the RG other than the RG dirty data amount A and stores the margin B in the RG determination management table 32200 (S4120). When writing of data in the cache memory and the destage are asynchronously performed, it is likely that destage to the RG additionally occurs. The margin B is a predicted value of a maximum destage amount that additionally occurs in this way. For example, the margin B is represented by reference margin×elapsed time. The reference margin [GB/s] is determined in advance on the basis of a maximum WR amount at the time when inflow limitation is not performed. Note that the reference margin may be determined for each of models of the storage apparatus 10 or may be determined according to a Write Pend ratio (hereinafter, WP ratio). The WP ratio is represented by dirty data amount/total capacity (number of dirty cache areas/total number of cache areas) in the data cache area 14000. The elapsed time [s] is a time obtained by subtracting the latest update time point of an RG actual free capacity from the present time point and indicates an update time interval of the RG actual free capacity. The update of the RG actual free capacity is performed by the SSD internal information acquisition processing explained above. When a load of the storage controller 100 is relatively low, the elapsed time is equal to the SSD internal information acquisition cycle. When the load of the storage controller 100 is relatively high, the elapsed time is longer than the SSD internal information acquisition cycle.

Thereafter, the storage controller 100 determines on the basis of the RG determination management table 32200 whether an inflow limitation condition is satisfied with respect to each of the RGs (S4130). The inflow limitation condition is represented by $A+B \geq C$ using the RG dirty data amount A, the margin B, and the RG actual free space C concerning the RG. The inflow limitation condition indicates that not all of data having a size of a sum of the RG dirty data amount A and the margin B can be written in the RG in an uncompressed manner. Note that the storage controller 100 may switch the inflow limitation condition of the RG according to presence or absence of the compressed configuration 13205 of the RG management table 13200.

Thereafter, the storage controller 100 determines whether the inflow limitation condition is satisfied in at least one RG in a result of S4130 (S4140).

When determining that the inflow limitation condition is satisfied in at least one RG (Y in S4140), the storage controller 100 configures a system flag to ON in the determination result management table 32300 (S4210).

Thereafter, the storage controller 100 updates the pool flag of each of the pools in the determination result management table 32300 (S4220). If a pool flag condition is satisfied with respect to each of the pools, the storage controller 100 configures the pool flag of the pool to ON. Otherwise, the storage controller 100 configures the pool flag of the pool to OFF. The pool flag condition means that, for example, as a result of S4130, the flow limitation condition of at least one RG in a pool to which a target RG belongs is satisfied.

Thereafter, the storage controller 100 updates the RG flag in the determination result management table 32300 (S4230) and ends this flow. If an RG flag condition is satisfied with respect to each of the RGs, the storage controller 100 configures the RG flag of the RG to ON. Otherwise, the storage controller 100 configures the RG flag of the RG to OFF. The RG flag condition means that, for example, as a result of S4130, the RG inflow limitation condition of the RG is satisfied or the RG inflow limitation condition of the RG is not satisfied and a free waiting job for the RG is present.

When determining in S4140 that the inflow limitation condition is not satisfied in all the RGs (N in S4140), the storage controller 100 configures the RG flags of all the RGs to OFF in the determination result management table 32300 (34240). Thereafter, the storage controller 100 configures the pool flags of all the pools to OFF (S4250). Thereafter, the storage controller 100 configures the system flag to OFF (S4260) and ends this flow.

According to the storage state update processing, by calculating an RG actual free capacity and an RG scheduled destage amount, the storage controller 100 can determine whether destage to the RGs is possible. By periodically determining whether destage to the RGs is possible and updating the determination result management table 32300, the storage controller 100 can use a result of the determination during reception of a WR request. By calculating an RG dirty data amount and a margin of the target RG, the storage controller 100 can calculate a data amount likely to be destaged to the target RG.

Figure 29:
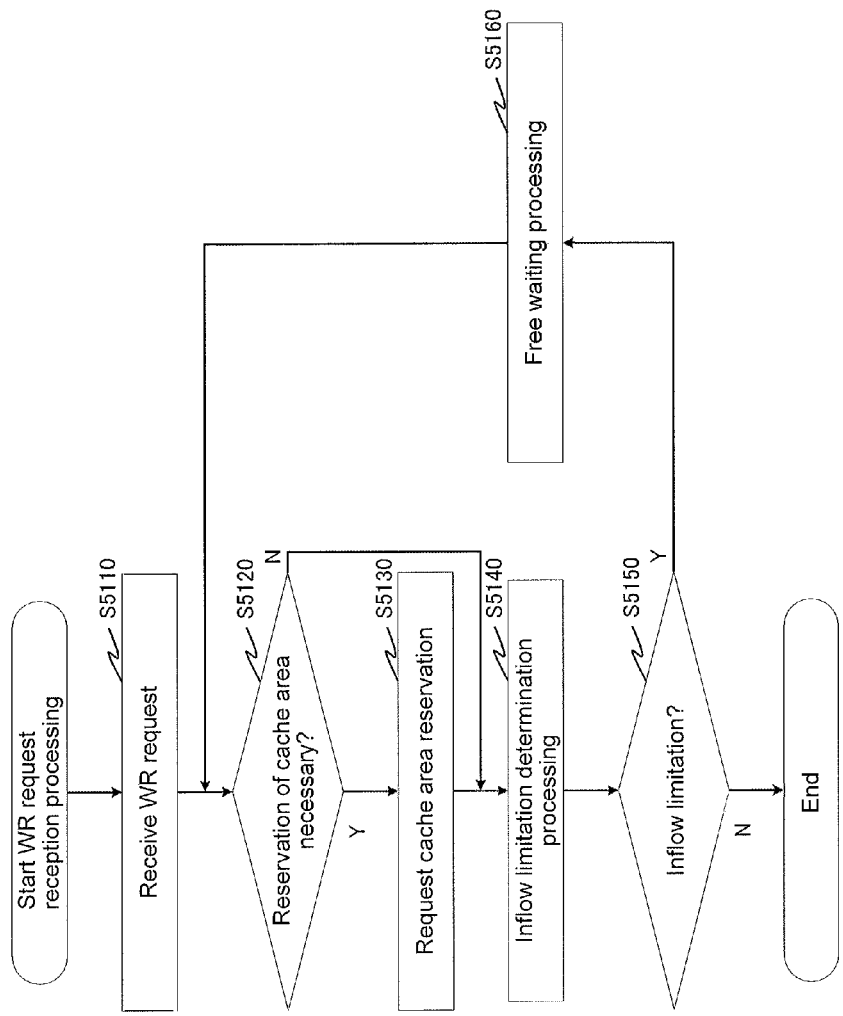
FIG. 29 shows WR request reception processing.

FIG. 29 shows WR request reception processing.

The storage controller 100 executes WR request reception processing according to the inflow control program 31100.

When receiving a WR request from the host computer 30 (S5110), the storage controller 100 determines on the basis of the cache management table 32100 whether it is necessary to reserve a cache area corresponding to a WR destination range indicated by the WR request (S5120). When the cache area is absent in the data cache area 14000 (cache mistake), the storage controller 100 determines that it is necessary to reserve the cache area.

When determining that it is unnecessary to reserve the cache area (N in S5120), the storage controller 100 shifts the processing to S5140.

When determining that it is necessary to reserve the cache area (Y in S5120), the storage controller 100 configures a cache area reservation request for reserving the cache area (S5130).

Thereafter, the storage controller 100 executes inflow limitation determination processing explained below (S5140) and determines whether to perform inflow limitation (S5150). When determining not to perform the inflow limitation (N in S5150), the storage controller 100 ends this flow.

When determining to perform the inflow limitation (Y in S5150), the storage controller 100 performs the free waiting processing (S5160). In the free waiting processing, the storage controller 100 starts a free waiting job for the target RG. Thereafter, until the free waiting job is released by free waiting job release processing explained below, the storage controller 100 repeatedly determines whether the free waiting job is released. When determining that the free waiting job is released, the storage controller 100 ends the free waiting processing and shifts the processing to S5110. During the free waiting processing, the storage controller 100 does not reserve a cache area and does not transmit a WR data transfer permission notification to the host computer 30.

According to this WR request reception processing, during the WR request reception, when determining to perform the inflow limitation for the target RG, the storage controller 100 can stay on standby without reserving a cache area for write data and prevent increases in an RG dirty data amount and a WP ratio. When determining not to perform the inflow limitation for the target RG, the storage controller 100 can receive write data from the host computer 30.

Figure 30:
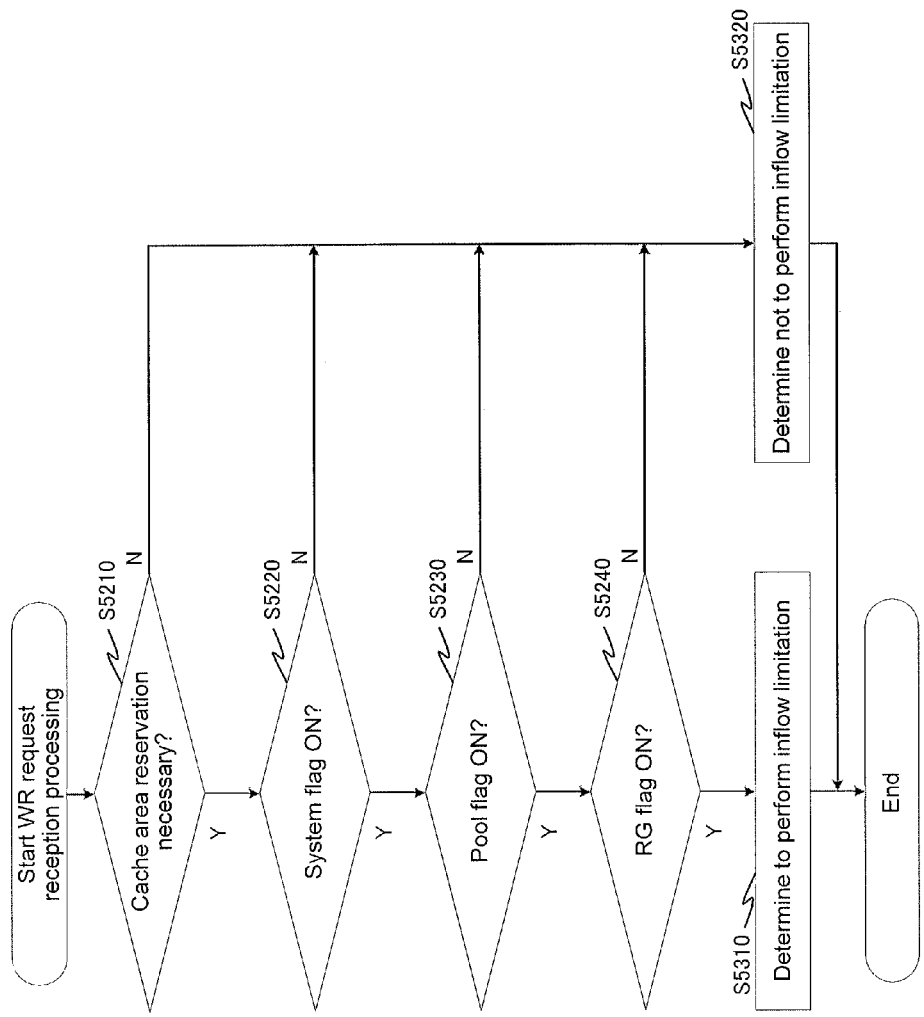
FIG. 30 shows inflow limitation determination processing.

FIG. 30 shows inflow limitation determination processing.

In S5140, the storage controller 100 executes the inflow limitation determination processing according to the inflow control program 31100. The storage controller 100 determines whether it is necessary to reserve a cache area (a cache area reservation request is configured) (S5210). When determining that it is unnecessary to reserve a cache area (N in S5210), the storage controller 100 determines not to perform the inflow limitation for the target RG (S5320) and ends the flow.

When determining that it is necessary to reserve a cache area (Y in S5210), the storage controller 100 determines on the basis of the determination result management table 32300 whether the system flag is ON (S5220). When determining that the system flag is OFF (N in S5210), the storage controller 100 shifts the processing to S5320 explained above.

When determining that the system flag is ON (Y in S5220), the storage controller 100 determines on the basis of the determination result management table 32300 whether a pool flag of a pool to which the target RG corresponding to the WR destination range belongs is ON (S5230). When determining that the pool flag is OFF (N in S5220), the storage controller 100 shifts the processing to S5320).

When determining that the pool flag is ON (Y in S5230), the storage controller 100 determines on the basis of the determination result management table 32300 whether an RG flag of the target RG is ON (S5240). When determining that the RG flag is OFF (N in S5230), the storage controller 100 shifts the processing to S5320 explained above.

When determining that the RG flag is ON (Y in S5240), the storage controller 100 determines to perform the inflow limitation for the target RG (S5310) and ends this flow.

Note that, when determining that the RG flag is ON (Y in S5240), the storage controller 100 may determine whether the target RG satisfies a free capacity insufficiency condition. When determining that the target RG satisfies the free capacity insufficiency condition, the storage controller 100 may shift the processing to S5310. When determining that the target RG does not satisfy the free capacity insufficiency condition, the storage controller 100 may shift the processing to S5320. The free space insufficiency condition is, for example, $A+B \geq C$. In this case, the storage controller 100 determines a type of I/O processing being executed and change the margin B according to the type. For example, a margin Ba in the case in which the I/O processing being executed is write from the host computer 30 to a cache and a margin Bb in the case in which the I/O processing being executed is destage are configured in advance. Ba is larger than Bb.

Note that, when a parameter error occurs because of the storage state update processing, the storage controller 100 determines to perform the inflow limitation for the target RG for safety.

According to the inflow limitation determination processing, by referring to the determination result management table 32300 during the WR request, the storage controller 100 can quickly determine whether to perform the inflow limitation on the target RG. For example, if any flag concerning the target RG is OFF, the storage controller 100 determines not to perform the inflow limitation. If all flags concerning the target RG are ON, the storage controller 100 determines to perform the inflow limitation.

Figure 31:
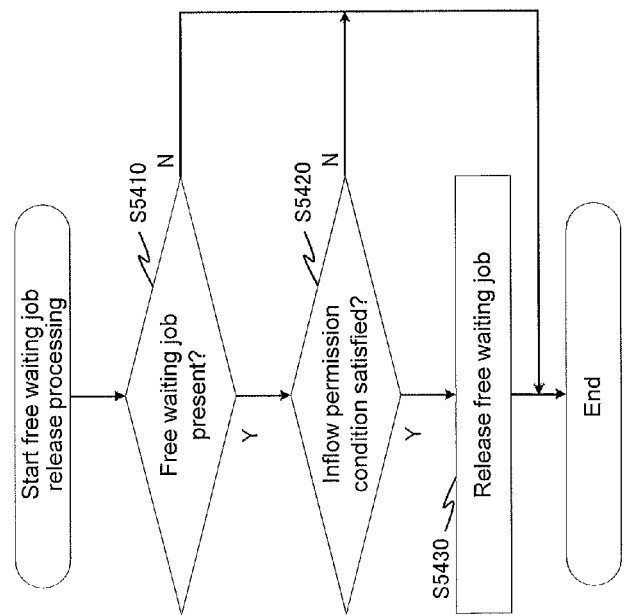
FIG. 31 shows free waiting job release processing.

FIG. 31 shows the free waiting job release processing.

The storage controller 100 executes the free waiting job release processing for each of the RGs asynchronously with an I/O request every time a preset free waiting job determination cycle elapses. The free waiting job determination cycle may be shorter than a storage state collection cycle.

The storage controller 100 determines whether the free waiting job is present for the target RG (S5410). When determining that the free waiting job is absent for the target RG (N in S5410), the storage controller 100 ends this flow.

When determining that the free waiting job is present for the target RG (Y in S4510), the storage controller 100 determines whether the target RG satisfies an inflow permission condition (S4520). The inflow permission condition is represented by, for example, A+B<C using the RG dirty data amount A, the margin B, and the RG actual free space C concerning the RG. The inflow permission condition indicates that all data of a size of a sum of the RG dirty data amount A and the margin B can be written in the RG in an uncompressed manner. When determining that the target RG satisfies the inflow permission condition (Y in S4520), the storage controller 100 releases the free waiting job (S4530) and ends this flow. When determining that the target RG does not satisfy the inflow permission condition (N in S4520), the storage controller 100 ends this flow and continues the free waiting job.

According to the free waiting job release processing, for example, when an RG free capacity of the target RG increases or when a dirty data amount of the target RG decreases, the storage controller 100 can release the free waiting job for the target RG. For example, the RG free capacity of the target RG increases according to the depletion avoidance processing explained below and the target RG satisfies the inflow permission condition, whereby the free waiting job is released. The host computer 30 can transmit, to the storage apparatus 10, WR data to the target RG. When a WR data transfer permission notification cannot be received from the storage apparatus 10 before the elapse of a preset WR waiting time, the host computer 30 determines that timeout occurs and suspends the processing concerning the WR request.

Figure 32:
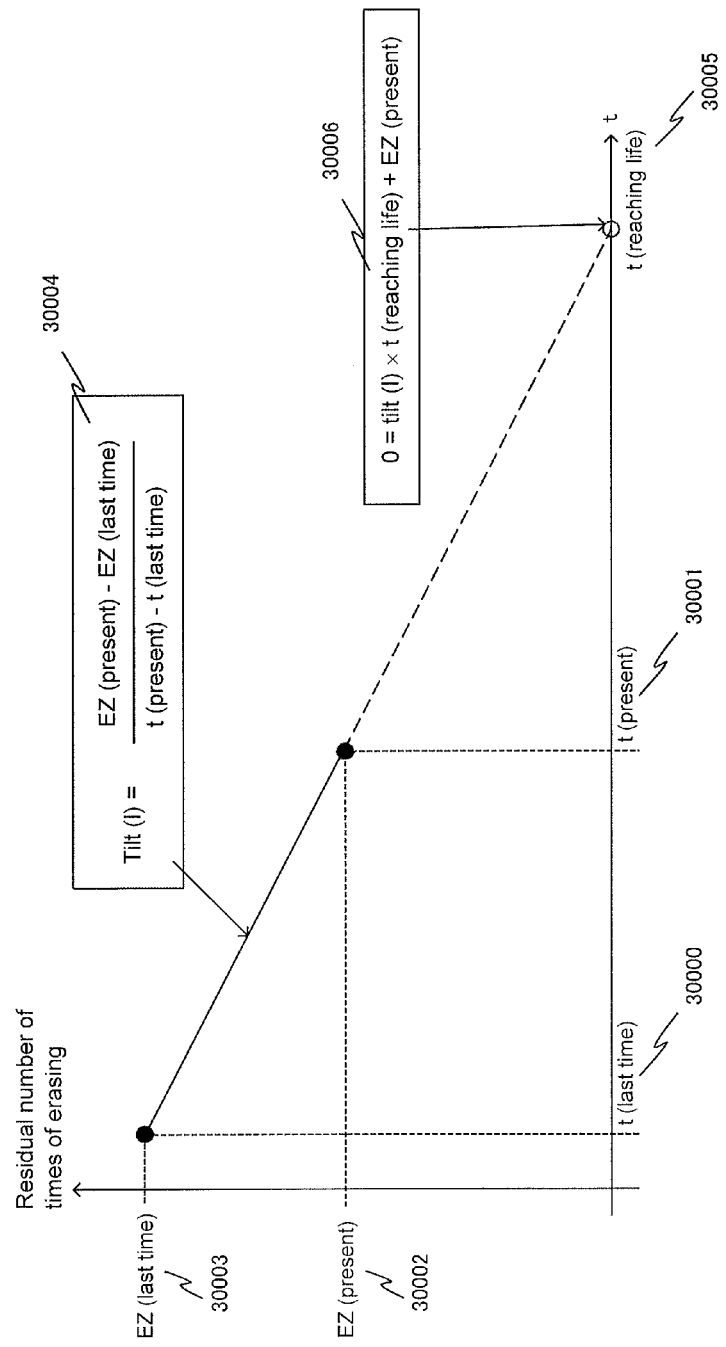
FIG. 32 is a schematic explanatory diagram of life prediction for the SSD.

FIG. 32 is a schematic explanatory diagram of life prediction for the SSD. The life prediction for the SSD is the processing executed in S305 explained above. In the figure, time is plotted on the horizontal axis and the residual number of times of erasing is plotted on the vertical axis.

As an example of a method of the life prediction for the SSD, a method of predicting a reaching time point to the end of the life of the SSD from decreasing speed of the residual number of times of erasing is explained. The life of the SSD is a period in which the SSD can be actually used. When WR concentrates on a certain SSD, the life of the SSD decreases. Therefore, it is necessary to perform the life leveling processing (specifically, processing for exchanging data stored in an extent or an entry between SSDs) such that another SSD having long life is actively used. Note that, in the life leveling processing, an SSD having a short residual life (the residual life equal to or smaller than a threshold) is detected.

In the example shown in the figure, t (last time) 30000 indicates a point in time when the life prediction is performed last time (last time life prediction time) and is a point in time corresponding to a value of the information update date 13103 of the Disk management TBL 13100. EZ (last time) 30003 is the residual number of times of erasing at the last life prediction time and is the number of times of the residual number of times of erasing 13110, t (present) 30001 is a point in time when the life prediction of this time is performed, and EZ (present) 30002 is the present residual number of times of erasing and is a value that can be acquired from SSD internal information acquired this time.

First, a tilt (I) is calculated according to the following Equation (1).

$$\text{Tilt}(I) = (EZ(\text{present}) - EZ(\text{last time})) \div (t(\text{present}) - t(\text{last time})) \quad (1)$$

A larger tilt (I) 30004 indicates that decreasing speed of the number of times of erasing is higher.

Subsequently, t (reaching life) is calculated according to the following Equation (2) using the tilt (I) 30004 and EZ (present) 30001, which is the residual number of times of erasing at the present point in time.

$$t(\text{reaching life}) = -(EZ(\text{present})\text{tilt}(I)) \quad (2)$$

A time when the number of times of erasing is zero, that is, a life reaching time is t (reaching life) 30005. In this way, it is possible to calculate the residual life period from the number of times of erasing and the decreasing speed of the residual number of times of erasing. The residual life period is stored in the predicted residual life 13105 of the Disk management TBL 13100.

It is important that a storage device and a storage apparatus are continuously used for a predetermined period (a guarantee period, e.g., 5 years) and data is guaranteed. Therefore, by executing the life leveling processing using the guarantee period as one index, it is possible to use a plurality of storage devices (e.g., SSDs) for the guarantee period or more. Note that, when an all Write total amount of data that can be written until the SSD reaches the life is known, t (reaching life) may be calculated with the residual Write amount (a value obtained by subtracting the FM write total amount 13108 from the all Write total amount) plotted on the vertical axis of the figure.

Figure 33:
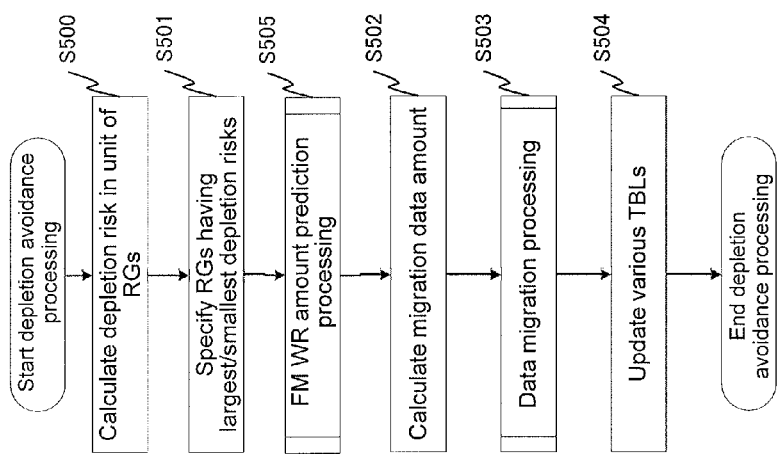
FIG. 33 is a flowchart showing an example of depletion avoidance processing according to the first embodiment.

FIG. 33 is a flowchart showing an example of the depletion avoidance processing according to the first embodiment. The depletion avoidance processing corresponds to the processing in S304 explained above.

The storage controller 100 calculates a depletion risk in RG units in all the RGs in the pool 500 (S500). The depletion risk in RG units may be a worst value of the depletion risk in SSD units calculated in S302 explained above in the SSD 700 configuring the RG or may be an average of depletion risks of the SSDs configuring the R.G.

Subsequently, the storage controller 100 specifies an RG having the highest depletion risk and an RG having the lowest depletion risk (S501). Subsequently, the storage controller 100 performs, on the basis of the statistical information management TBL 13600 and the statistical information management TBL 23200 of the SSD 700, FM WR amount prediction processing (explained below) for predicting an FM WR amount of each of entries or extents (S505).

Subsequently, the storage controller 100 calculates a migrating data amount (S502). As the migrating data amount, an amount lower than a threshold may be configured as a migration amount or an amount for leveling the depletion risk between target RGs (an RG having the largest depletion risk and an RG having the smallest depletion risk) may be configured as the migration amount. The threshold may be configured by the administrator of the storage apparatus 10 via the control software or the like installed in the host computer 30.

Subsequently, the storage controller 100 executes data migration processing (explained below) for migrating data by a determined amount (S503). Finally, the storage controller 100 updates the information of the various TBLs (S504) and ends the depletion avoidance processing.

According to the depletion avoidance processing, by migrating data having a large FM WR amount from an RG having a high depletion risk to an RG having a low depletion risk in extent units, it is possible to reduce a risk of SSD depletion with a minimum number of times of extent migration.

Note that, in the depletion avoidance processing, the storage controller 100 may determine whether RG actual use ratios of each of the RGs (a ratio of an RG actual use amount to a physical capacity of the RG) exceeds a preset RG actual use ratio threshold. When the RG actual use ratio exceeds the RG actual use ratio threshold, the storage controller 100 may perform data migration processing from the RG to another RG.

According to the depletion avoidance processing, by migrating data from the target RG of the free waiting job to another RG, the storage controller 100 can increase an actual free capacity of the target RG and release the free waiting job according to the free waiting job release processing explained above.

Figure 34:
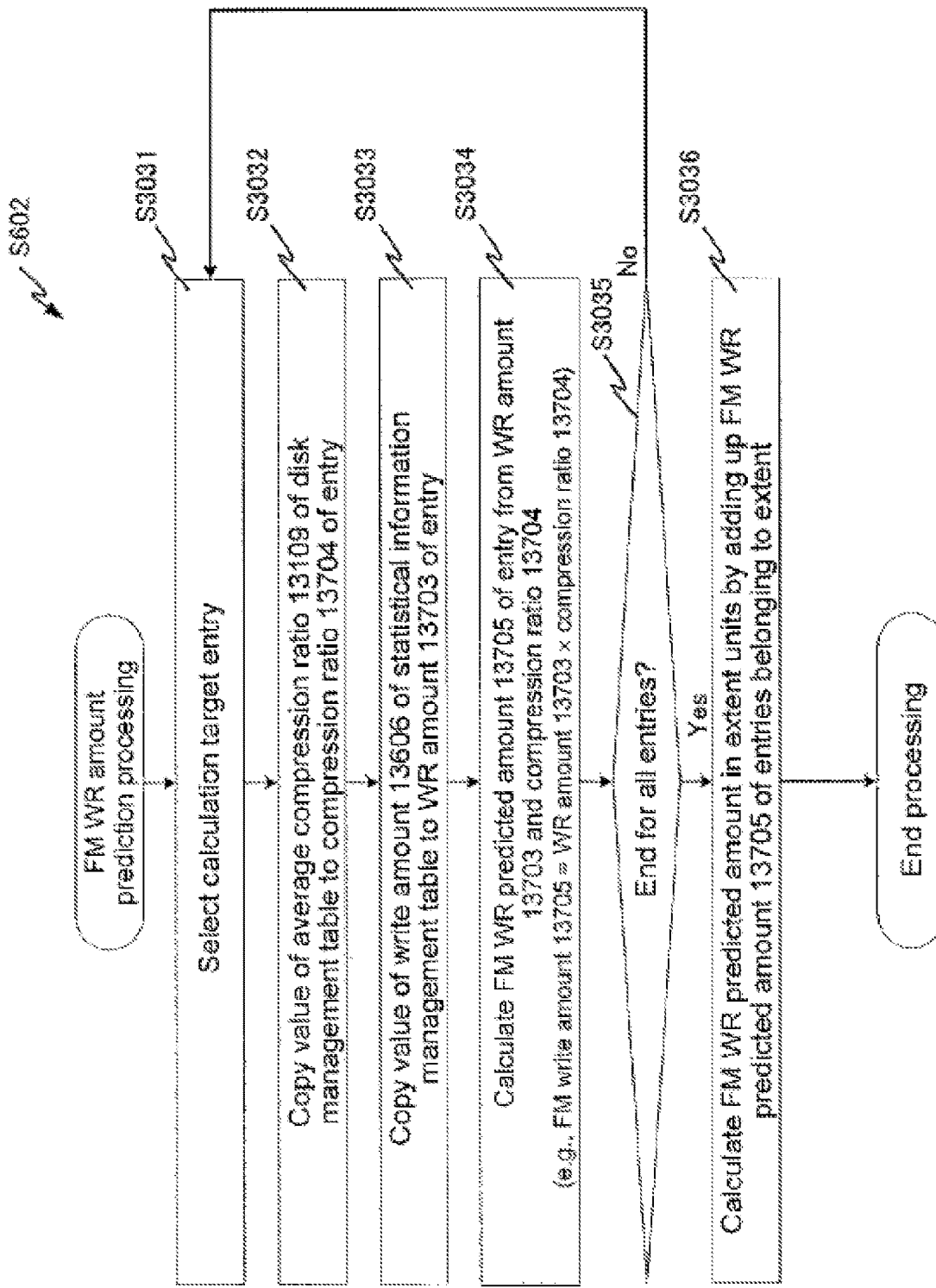
FIG. 34 is a flowchart showing an example of FM WR amount prediction processing according to the first embodiment.

FIG. 34 is a flowchart showing an example of FM WR amount prediction processing according to the first embodiment. The FM WR amount prediction processing corresponds to the processing in S505 explained above. The FM WR amount prediction processing is processing in which the storage controller 100 calculates the FM WR predicted amount 13705 of the FM WR amount prediction TBL 13700.

The storage controller 100 selects an entry set as a calculation target of prediction of an FM write amount (S3031). Subsequently, the storage controller 100 stores (copies) a value acquired from the average compression ratio 13109 of the Disk management TBL 13100 in the compression ratio 13704 of the selected entry (S3032). Subsequently, the storage controller 100 acquires the WR amount 13606 corresponding to the entry from the statistical information management TBL 13600 and stores (copies) a value of the WR amount 13606 in the WR amount 13703 of the entry (S3033).

Subsequently, the storage controller 100 multiplies together the WR amount 13703 and the compression ratio 13704 to calculate the FM WR predicted amount 13705 of the entry (S3034). Subsequently, the storage controller 100 determines whether a calculation target entry remains (S3035). When the calculation target entry remains (No in S3035), the storage controller 100 selects the next entry and repeats the processing in S3032 to S3035. On the other hand, when determining in S3035 that the calculation target entry does not remain (Yes in S3035), the storage controller 100 calculates an FM WR predicted amount of each of extents (S3036). Specifically, the storage controller 100 refers to the extent management TBL 13400 to specify entries belonging to each of the extents and calculates a total value of the FM WR predicted amount 13705 of the specified entries. Thereafter, the storage controller 100 ends the FM WR amount prediction processing.

Figure 35:
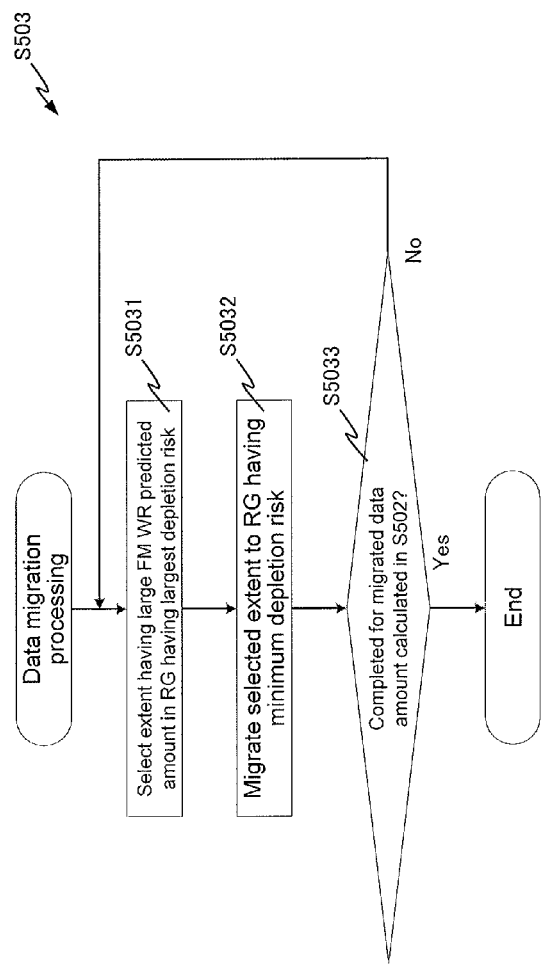
FIG. 35 is a flowchart showing an example of data migration processing in the depletion avoidance processing according to the first embodiment.

FIG. 35 is a flowchart showing an example of data migration processing in the depletion avoidance processing according to the first embodiment. The data migration processing corresponds to the processing in S503 explained above.

The storage controller 100 selects an extent having a large FM WR predicted amount calculated in the FM WR amount prediction Processing in S505 in the RG having the largest depletion risk specified in S501 explained above (S5031). The extent having the large FM WR predicted amount is an extent having the largest FM WR predicted amount among the plurality of extents.

Subsequently, the storage controller 100 migrates the selected extent to the RG having the smallest depletion risk specified in S501 explained above (S5032). Subsequently, the storage controller 100 determines whether a data amount migrated from the RG having the largest depletion risk to the RG having the smallest depletion risk reaches the migration data amount calculated in S502 explained above (S5033).

If a result of the determination is negative (No in S5033), the storage controller 100 repeats the data migration processing from the processing in S5031. On the other hand, when the result of the determination is affirmative (Yes in S5033), the storage controller 100 ends the data migration processing.

According to the processing, by migrating the extent having the large FM WR predicted amount of the RG having the high depletion risk to the RG having the low depletion risk, it is possible to reduce a risk of SSD depletion with a minimum number of times of extent migration.

Figure 36:
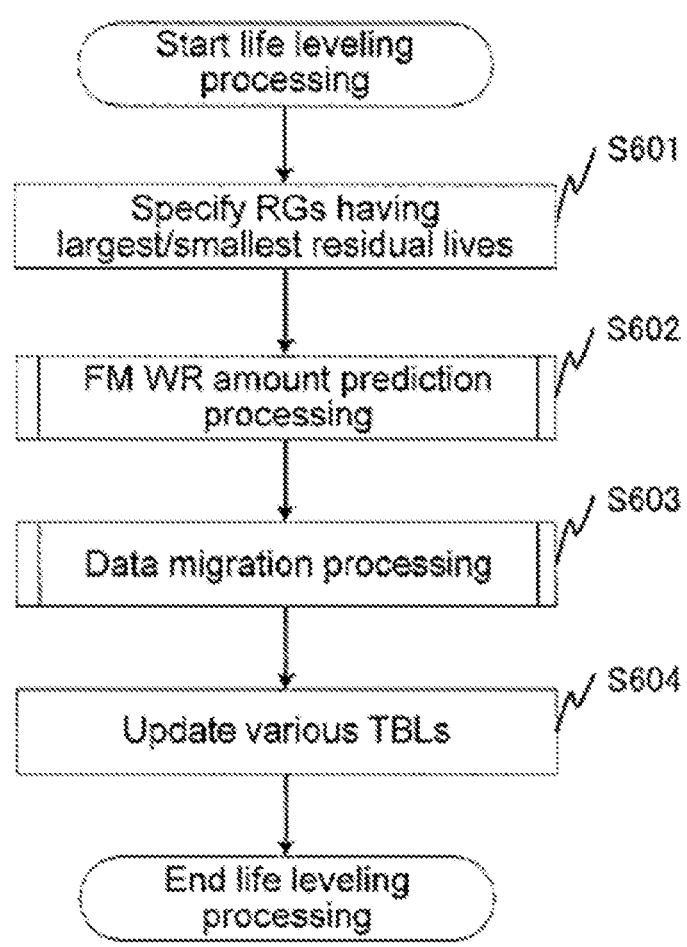
FIG. 36 is a flowchart showing an example of life leveling processing according to the first embodiment.

FIG. 36 is a flowchart for explaining an example of the life leveling processing according to the first embodiment. The life leveling processing corresponds to the processing in S307 explained above.

The storage controller 100 specifies an RG having the largest residual life and an RG having the smallest residual life (S601) and executes, on the basis of the statistical information management TBL 13600 and the statistical information management TBL 23200 of the SSD 700, FM WR amount prediction Processing (explained below) for predicting an FM WR amount of each of entries or extents (S602).

Thereafter, the storage controller 100 executes data migration processing (explained below) for executing data migration (S603), updates the various tables (S604), and ends the life leveling processing.

Figure 37:
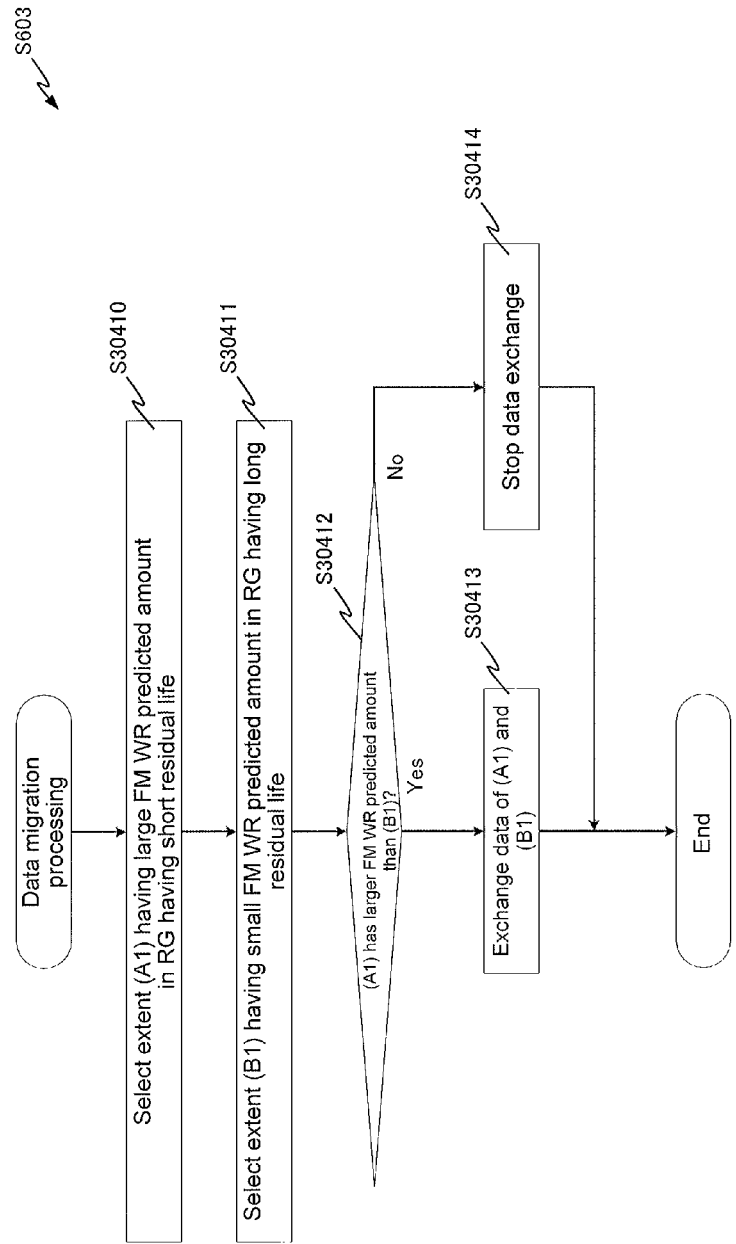
FIG. 37 is a flowchart showing an example of data migration processing in the life leveling processing according to the first embodiment.

FIG. 37 is a flowchart showing an example of data migration processing in the life leveling processing according to the first embodiment. The data migration processing is processing corresponding to S603 explained above.

The storage controller 100 selects an extent (A1) having a large FM WR predicted amount in the RG having the short life serving as the migration source of the data of the life leveling processing specified in S601 explained above (S30410). The extent having the large FM WR predicted amount is an extent having the largest FM WR predicted amount among the plurality of extents.

Subsequently, the storage controller 100 selects an extent (B1) having a small FM WR predicted amount in the RG having the long life serving as the migration destination of the life leveling processing specified in S601 explained above (S30411). The extent having the small FM WR predicted amount is an extent having the smallest FM WR predicted amount among the plurality of extents. Note that the storage controller 100 may group extents having FM WR predicted amounts equal to or smaller than a threshold and select one extent out of the group.

The storage controller 100 determines whether the FM WR predicted amount of the extent (A1) is larger than the FM WR predicted amount of the extent (B1) (S30412). When the FM WR predicted amount of the extent (B1) is larger than the FM WR predicted amount of the extent (A1), if data of the extent (B1) is migrated to the RG having the short residual life, a WR data amount in the RG further increases. The numbers of times of erasing are not leveled between the devices. Therefore, by performing this determination and stopping the data exchange, it is possible to appropriately perform leveling of the number of times of erasing between the devices without performing unnecessary data migration.

If a result of the determination is affirmative (Yes in S30412), the processor 104 exchanges data in the extent (A1) and data in the extent (B1) (S30413) and ends the data migration processing. On the other hand, if the result of the determination is negative (No in S30412), the processor 104 stops the data exchange (S30414) and ends this processing.

When the extent having the large FM WR predicted amount of the RG having the short residual life and the extent having the small FM WR predicted amount of the RG having the long residual life, the WR data amount in the SSD configuring the RG having the short residual life decreases. Therefore, it is possible to suppress a decrease in the residual life. On the other hand, the WR data amount of the RG having the lona residual life increases. Therefore, according to the data exchange, it is possible to reduce deviation of the residual lives between the RGs. That is, it is possible to level SSD lives.

Figure 38:
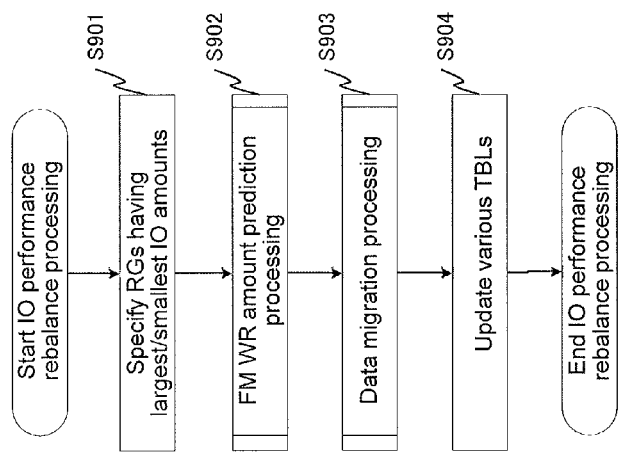
FIG. 38 is a flowchart showing an example of I/O performance rebalance processing according to the first embodiment.

FIG. 38 is a flowchart showing an example of the I/O performance rebalance processing according to the first embodiment. The I/O performance rebalance processing corresponds to the processing in S310 explained above.

The storage controller 100 specifies an RG having the largest I/O amount per RG physical capacity and an RG having the smallest I/O amount per RG physical capacity (S901). The storage controller 100 predicts, on the basis of the statistical information management TBL 13600 and the statistical information management TBL 23200 of the SSD 700, an FM RD/WR predicted amount (an FM RD predicted amount and an FM WR predicted amount) of each of entries or extents (S902). Specifically, the I/O performance rebalance processing is processing for predicting an FM RD predicted amount according to processing same as the FM WR amount prediction processing explained above.

Thereafter, the storage controller 100 executes data migration (S903), updates the various tables (S904), and ends the I/O performance rebalance processing. In S903, the storage controller 100 exchanges, according to the same processing as the data migration processing in S603 explained above, data of an extent having a large I/O amount of an RG having a large I/O amount (FM RD/WR predicted amount) per RG physical capacity and an extent having a small I/O amount of an RG having a small I/O amount per RG physical capacity to thereby reduce an I/O amount of the RG having the large I/O amount and, on the other hand, increases an I/O amount of the RG having the small I/O amount. This data exchange can reduce deviation of I/O amounts between the RGs. That is, it is possible to level I/O performance. According to the I/O performance rebalance processing, it is possible to avoid a performance bottleneck by migrating stored data in extent units from the RG having the large I/O amount to the RG having the small I/O amount.

The storage controller 100 may have a function of storage tier virtualization. In this case, the storage controller 100 configures an RG to any one of a plurality of Tiers, measures an access frequency for each of virtual storage areas of a virtual extent or the like, and arranges the virtual storage area in any one of the plurality of Tiers on the basis of the access frequency. The storage controller 100 may periodically execute rearrangement of the virtual storage area or may execute the rearrangement in response to an I/O request. The storage controller 100 may execute the IO performance rebalance processing for migrating data between the Tiers.

During the depletion avoidance processing, the storage controller 100 stops the IO performance rebalance processing, the IO performance rebalance processing between the Tiers, the rearrangement of storage tier virtualization, and the like. Consequently, the storage controller 100 preferentially executes an increase of an actual free capacity of the target RG. When an RG is depleted, it is likely that an error of a WR request of overwrite on an allocated page occurs to cause system-down of the host computer 30. Therefore, the depletion avoidance processing is prioritized in this way.

According to these kinds of data migration control processing, the storage controller 100 can adjust an actual free capacity of the RG by allocating an extent in the RG to a virtual extent, migrating data in the extent to an extent in another RG, and allocating an extent at a migration destination to the virtual extent to which the extent at a migration source is allocated.

Second Embodiment

In a second embodiment, a storage apparatus including a plurality of storage controllers (cluster) is explained. In this embodiment, differences from the first embodiment are explained.

Figure 39:
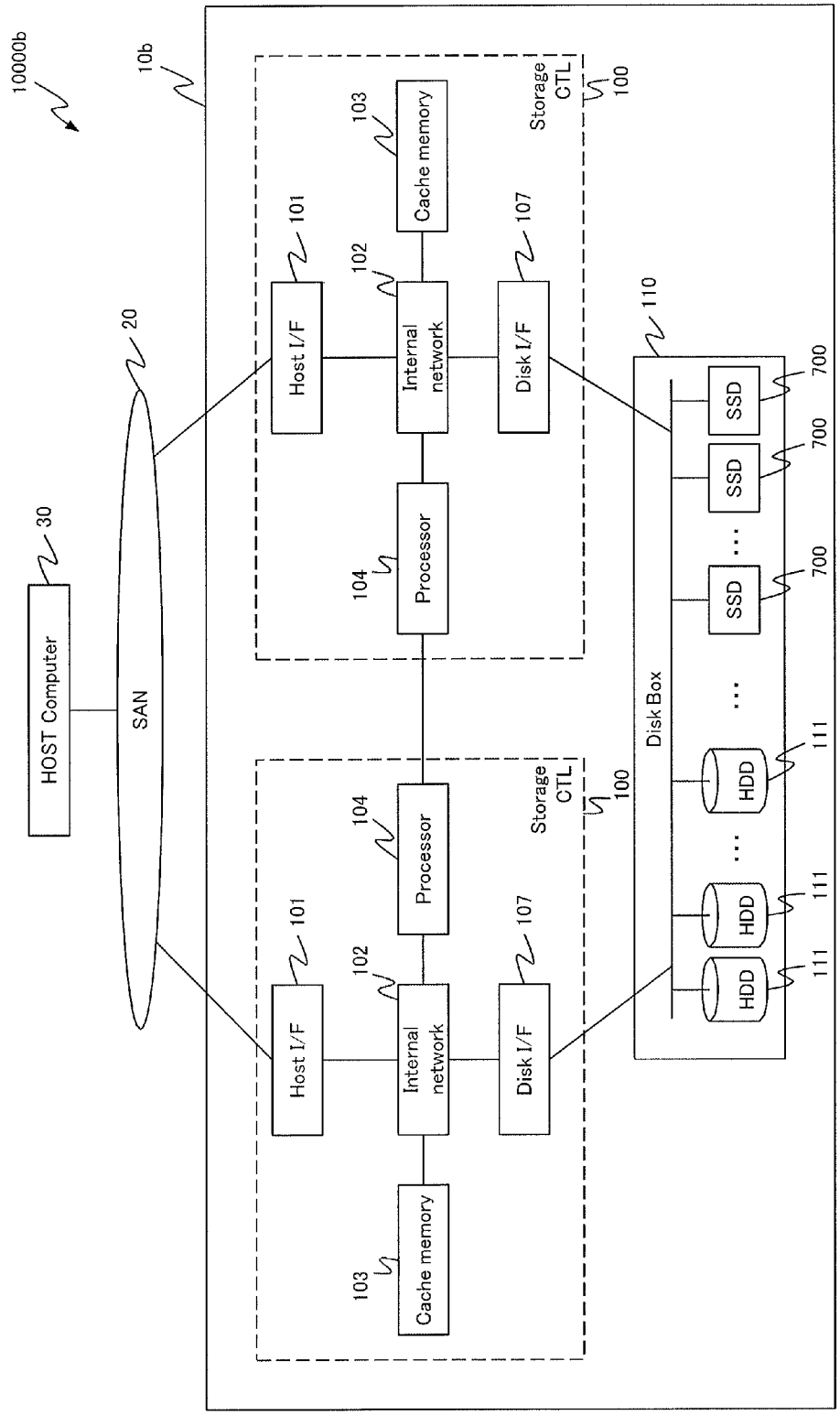
FIG. 39 is a diagram showing a configuration example of a storage system 10000*b* including a storage apparatus 10*b* according to a second embodiment.

FIG. 39 is a diagram showing a configuration example of a storage system 10000b including a storage apparatus 10b according to the second embodiment.

The storage apparatus 10b includes two storage controllers 100. The processor 104 in the storage controller 100 is coupled to a processor in another storage controller 100. The host computer 30 is coupled to the two storage controllers 100 via the SAN 20. The Disk Box 110 is coupled to the two storage controllers 100. The two storage controllers 100 are respectively referred to as first storage controller and second storage controller. The cache memory 130 in the first storage controller is referred to as first cache memory and the cache memory 130 in the second storage controller is referred to as second cache memory.

Write processing in this embodiment is explained.

When receiving a WR request from the host computer 30, as in the first embodiment, the first storage controller executes the processing in S20 to S40. In S50, the first storage controller determines whether a cache area corresponding to a WR destination range is already allocated to both of the first cache memory and the second cache memory. When determining that the cache area corresponding to the WR destination range is not allocated to at least one of the first cache memory and the second cache memory, in S60, the first storage controller reserves the cache area corresponding to the WR destination range from the cache memory determined as not being allocated with the cache area.

Thereafter, when receiving WR data from the host computer 30 in S70 and S80, in S85, the first storage controller writes the received WR data in both of the first cache memory and the second cache memory. In S90, the first storage controller transmits a WR data transfer permission notification to the host computer 30.

WR request reception processing in this embodiment is explained.

In S5120, when the cache area corresponding to the WR destination range is present in both of the first cache memory and the second cache memory, the storage controller 100 determines that it is unnecessary to reserve the cache area. When the cache area is absent in at least one of the first cache memory and the second cache memory, the storage controller 100 determines that it is necessary to reserve the cache area. When determining that it is necessary to reserve the cache area (Y in S5120), in S5130, the storage controller 100 configures a cache area reservation request to the cache memory in which the cache area is absent.

According to this embodiment, the storage controller 100 writes write data received from the host computer 30 in the two cache memories 130 and transmits a response to the host computer 30. Consequently, it is possible to reduce a response time to a WR request and improve reliability.

The several embodiments are explained above. However, the Present invention is not limited to the embodiments. It goes without saying that various changes are possible in a range not departing from the spirit of the present invention.

For example, the storage controller 100 may acquire a compression ratio in entry units. Specifically, when completing WR, the SSD controller 710 gives a data compression ratio in entry units to a response command transmitted to the storage controller 100. By referring to the data compression ratio included in the response command, the storage controller 100 is capable of managing a compression ratio for each of the entries.

Consequently, it is possible to improve prediction accuracy of an FM WR predicted amount for each of the entries. As a result, it is possible to improve execution accuracy of the life leveling processing.

WA (Write Amplification) may be added to prediction materials for an FM WR amount in addition to the compression ratio.

In general, since processing unique to an SSD such as WL and reclamation occurs inside the SSD 700, an amount of data actually written in the flash memory is large compared with an amount of data received from the storage controller 100 by the SSD 700. A ratio of the amount of the data actually written in the flash memory to the amount of the received data is called WA. An increase in a WR data amount by processing inside the SSD depends on an access pattern, a size of WR data, and the like as well.

When the WR data amount increases according to the unique Processing in the SSD 700, the number of times of erasing also increases according to the increase in the WR data amount. Therefore, the storage controller 100 additionally acquires the WA from the SSD controller 710 and adds a value of the WA to the prediction materials for the FM WR predicted amount. Consequently, it is possible to further improve the accuracy of the life leveling processing.

First, the WA is explained.

The WA is a ratio ((b)/(a)) obtained by dividing (b) by (a) explained below. (a) is an amount of data received from the storage controller 100 by the SSD 700. (b) is an amount of data actually written in the flash memory.

For example, in a state in which no data is written in the SSD 700, when the SSD 700 receives WR data from the storage controller 100, the data is directly written in a free page. Therefore, the WA is highly likely to be "1.0". For example, when valid data is written in a page of the SSD 700 and a free page is absent and it is necessary to perform reclamation processing, a page serving as a migration destination of the valid data and a page for writing data from the storage controller 100 are necessary. Therefore, WA exceeds "1.0". Note that, the reclamation processing is, for example, processing for, when a free block starts to be depleted, integrating pages in which the valid data is stored and writing the pages in another block to generate a block including only invalid data and erasing the data in the block to generate a free block.

Therefore, in order to accurately predict a data WR amount to the FM, it is necessary to take into account the WA, which is a parameter indicating an internal copy amount. Therefore, the storage controller 100 can acquire WA anew from the SSD 700 through the SSD internal information acquisition command and add the WA to the prediction materials for the FM WR predicted amount.

An FM use amount in entry units may be notified from the SSD 700 to the storage controller 100. Consequently, the storage controller 100 does not need to predict an FM WR amount and can execute the life leveling processing directly using the FM use amount notified from the SSD 700. Therefore, it is possible to reduce loads (computational complexity) on the storage controller 100. Further, even when the SSD 700 has the data compressing function and a data WR amount managed by the storage controller 100 and an actual FM WR amount inside the SSD are different, the storage controller 100 can highly accurately realize the life leveling processing and the I/O performance rebalance processing.

The flash memory has a characteristic that, even when data is repeatedly read from a page, breakage of the data easily occurs. Therefore, a general SSD has a function of storing an ECC, which is an error correction code for data, in a page together with the data and, during data read, partially recovering from the occurred error with the ECC. Further, such an SSD has a function of migrating the data to another page when the number of occurrences of data errors exceeds a certain threshold. Therefore, even under an environment in which only RD of data occurs, erasing of the flash memory could occur. Therefore, as a determination material for the life leveling processing, information (the number of RD I/Os and/or a data RD amount) concerning RD for each of extents or entries may be used.

In the embodiments, the storage controller 100 performs the processing for converting the residual number of times of erasing into the residual number of days. However, the SSD 700 may notify the residual number of days to the storage controller 100. This can be realized by, for example, the SSD 700 including the function of converting the residual number of times of erasing into the residual number of days explained above.

In the embodiments, the depletion avoidance processing, the life leveling processing, and the I/O performance rebalance processing are executed in extent units. However, these kinds of processing may be performed in other units (e.g., entry units or LU units).

When RGs of compressed configuration (compressed RGs) and RGs of uncompressed configuration (uncompressed RGs) are mixed in the storage apparatus 10, the depletion avoidance processing, the life leveling processing, and the I/O performance rebalance processing may be carried out between the compressed RGs and the uncompressed RGs. Further, a plurality of patterns may be prepared in the storage apparatus 10 as migration policies of the respective kinds of processing; for example, (1) the depletion avoidance processing, the life leveling processing, and the I/O performance rebalance processing are permitted only between the compressed RGs, (2) the life leveling processing and the I/O performance rebalance processing are permitted only between the uncompressed RGs, and (3) the depletion avoidance processing, the life leveling processing, and the I/O performance rebalance processing between the compressed RGs and between the uncompressed RGs are permitted. The user or the administrator may select a migration policy corresponding to a use application for each predetermined storage unit (e.g., RG or LU) via the host computer 30, a management computer, or the like. Processing conforming to the selected migration policy may be performed by the storage apparatus 10.

A data size of data compressed by an application of the host computer 30 does not change even if the data is compressed again in the SSD 700 of the storage apparatus 10. Therefore, an interface for notifying whether the data is already compressed from the host computer 30 to the storage controller 100 may be prepared. On the basis of the information, the storage controller 100 may determine necessity of compression, determine in which RG of the compressed RG or the uncompressed RG the data is stored, and determine a migration policy of the life leveling processing. As the prepared interface, for example, a field indicating whether the data is compressed may be included in a write request command transmitted to the storage controller 100 by the host computer 30.

Terms for expressions in the present invention are explained. The storage device may be the SSD 700 or the HDD 111. Each of the first memory and the second memory may be the cache memory 130. The processor may be the processor 104. Each of the first storage device group and the second storage device group may be the RG or the PG. The storage device information may be the statistical information management TBL 23200. The cache information may be the cache management table 32100. The storage device controller may be the SSD controller 710. The nonvolatile semiconductor memory may be the flash memory 780. The destage determination may be the storage state update processing. The reservation determination may be S5210 to S320 of the inflow limitation determination processing. The standby may be the free waiting job. The free capacity may be the RG actual free capacity. The release condition may be the inflow permission condition. The physical storage area may be the extent. The virtual storage area may be the virtual extent. The depletion condition may be a condition that the depletion risk of the first storage device group is the largest or a condition that the RG actual use ratio exceeds the RG actual use ratio threshold. The dirty data amount may be the RG dirty data amount. The result of the destage determination may be the determination result management table 32300. The scheduled destage amount may be the RG scheduled destage amount.

REFERENCE SIGNS LIST

10: storage apparatus
11: Disk
30: host computer
100: storage controller
130: cache memory
700: SSD
710: SSD controller
780: flash memory
781: flash controller
10000: storage system

The invention claimed is:

1. A storage apparatus comprising:
a plurality of storage devices;
a first memory; and
a processor coupled to the plurality of storage devices, the first memory, and a higher-level apparatus, wherein the storage apparatus is operable to
configure, via the processor, at least a part of the plurality of storage devices as a first storage device group,
create, via the processor, cache information that indicates a state of a plurality of cache areas in the first memory,
associate, via the processor, with the first storage device group, the cache areas in which data from the higher-level apparatus is stored,
acquire, via the processor, storage device information from each of the storage devices,
when receiving a write request to the first storage device group from the higher-level apparatus:
determine, via the processor, a first indication that indicates whether the first storage device group is available for destaging based on the storage device information and the cache information,
determine, via the processor, a second indication that indicates whether a write destination cache area corresponding to a write destination address indicated by the write request is reserved based on the first indication,
on a condition that the second indication indicates the destination cache area is reserved:
transmit, to the higher-level apparatus, a WR data transfer permission notification for causing the higher-level apparatus to transmit write data,
receive, via the processor, the write data from the higher-level apparatus, and write the write data in the write destination cache area,
destage, via the processor, the write data in the write destination cache area to the write destination address,
compress, via at least one of the plurality of storage devices, destaged data to convert the destaged data into compressed data, and
store, via at least one of the plurality of storage devices, the compressed data and storage device information based on a use amount of the plurality of storage devices,
on a condition that the second indication indicates that the destination cache area is not reserved:
determine, via the processor, a third indication of whether to reserve the write destination cache area based on the first indication, the storage device information, and the cache information,
on a condition that the third indication indicates to reserve the write destination cache area, reserve the write destination cache area, and
on a condition that the third indication indicates not to reserve the write destination cache area, standby for a subsequent reservation of the write destination cache area.

2. The storage apparatus according to claim 1, wherein the processor is further configured to:
calculate a physical free capacity of the first storage device group based on the storage device information, and
calculate a scheduled destage amount based on the cache information, wherein the scheduled destage amount is an amount of data to be destaged to the first storage device group,
wherein the first indication indicates that the first storage device group is available for destaging when the free capacity is larger than the scheduled destage amount.

3. The storage apparatus according to claim 2, wherein the processor is further configured to:
provide a virtual volume to the higher-level apparatus, and allocate a physical storage area in the first storage device group to a virtual storage area in the virtual volume.

4. The storage apparatus according to claim 3, wherein the processor is further configured to:

configure, as a second storage device group, a part of the plurality of storage devices other than the first storage device group, determine a fourth indication that indicates whether the first storage device group satisfies a preset depletion condition based on the storage device information, and on a condition that the fourth indication indicates that the depletion condition is satisfied, migrate data stored in a first physical storage area in the first storage device group to a second physical storage area in the second storage device group and allocate the second physical storage area to the virtual storage area to which the first physical storage area is allocated.

5. The storage apparatus according to claim 4, wherein the processor is further configured to:

calculate a dirty data amount of the cache area corresponding to the first storage device group based on the cache information, determine a margin concerning the dirty data amount based on the storage device information, and calculate a sum of the dirty data amount and the margin as the scheduled destage amount.

6. The storage apparatus according to claim 5, wherein the storage device is configured to include a storage device controller coupled to the processor and a non-volatile semiconductor memory coupled to the storage device controller, and the storage device controller is configured to perform compression of the destaged data, wherein the destaged data includes the dirty data, and write the compressed data in the nonvolatile semiconductor memory.

7. The storage apparatus according to claim 1, further comprising a second memory coupled to the processor, wherein when a cache area corresponding to the write destination is reserved in both of the first memory and the second memory, the processor is configured to determine that the write destination cache area is reserved, and when receiving the write data from the higher-level apparatus, the processor is configured to write the write data in both of the first memory and the second memory.

8. A non-transitory computer-readable recording medium storing a program that when executed by a processor causes:

configuring, via the processor, at least a part of a plurality of storage devices as a first storage device group, wherein the first storage device group is coupled to the processor;

creating, via the processor, cache information that indicates a state of a plurality of cache areas in a first memory, wherein the first memory is coupled to the processor;

associating, via the processor, the cache areas in which data from a higher-level apparatus is stored with the first storage device group;

acquiring, via the processor, storage device information from each of the storage devices;

when receiving, via the processor, a write request to the first storage device group from the higher-level apparatus;

determining, via the processor, a first indication that indicates whether the first storage device group is available for destaging based on the storage device information and the cache information;

determining, via the processor, a second indication that indicates whether a write destination cache area corresponding to a write destination address indicated by the write request is reserved based on the first indication;

on a condition that the second indication indicates the destination cache area is reserved:

transmitting, via the processor, to the higher-level apparatus, a WR data transfer permission notification for causing the higher-level apparatus to transmit write data, receiving, via the processor, the write data from the higher-level apparatus, and write the write data in the write destination cache area;

destaging, via the processor, the write data in the write destination cache area to the write destination address;

compress, via at least one of the plurality of storage devices, destaged data to convert the destaged data into compressed data; and store, via at least one of the plurality of storage devices, the compressed data and storage device information based on a use amount of the plurality of storage devices, on a condition that the second indication indicates that the destination cache area is not reserved:

determining, via the processor, a third indication of whether to reserve the write destination cache area based on the first indication, the storage device information, and the cache information, on a condition that the third indication indicates to reserve the write destination cache area reserve the write destination cache area, and on a condition that the third indication indicates not to reserve the write destination cache area, standby for a subsequent reservation of the write destination cache area.

9. A storage control method comprising:

configuring at least a part of a plurality of storage devices as a first storage device group;

creating cache information that indicates a state of a plurality of cache areas in a first memory;

associating, with the first storage device group, the cache areas in which data from a higher-level apparatus is stored;

acquiring storage device information from each of the storage devices, when receiving a write request to the first storage device group from the higher-level apparatus:

determining a first indication that indicates whether the first storage device group is available for destaging based on the storage device information and the cache information;

determining a second indication that indicates whether a write destination cache area corresponding to a write destination address indicated by the write request is reserved;

on a condition that the second indication indicates the destination cache area is reserved:

transmit, to the higher-level apparatus, a WR data transfer permission notification for causing the higher-level apparatus to transmit write data, receive the write data from the higher-level apparatus, and write the write data in the write destination cache area, destage the write data in the write destination cache area to the write destination address, compressing, via at least one of the plurality of storage devices, the destaged data to convert the destaged data into compressed data, and storing, via at least one of the plurality of storage devices, the compressed data and storage device information based on a use amount of the plurality of storage devices, on a condition that the second indication indicates that the write destination cache area is not reserved:
  determining a third indication that indicates whether to reserve the write destination cache area based on the first indication, the storage device information, and the cache information,
  on a condition that the third indication indicates to reserve the write destination cache area, reserving the write destination cache area, and
  on a condition that the third indication indicates not to reserve the write destination cache area, standing by for a subsequent reservation of the write destination cache area.

* * * * *